US012701590B2

(12) United States Patent
Wang et al.

(10) Patent No.: US 12,701,590 B2
(45) Date of Patent: Aug. 4, 2026

(54) CONFLICT INDICATION METHOD AND APPARATUS, AND ELECTRONIC DEVICE

(71) Applicant: VIVO MOBILE COMMUNICATION CO., LTD., Chang'an Dongguan (CN)

(72) Inventors: Huan Wang, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 331 days.

(21) Appl. No.: 18/446,395

(22) Filed: Aug. 8, 2023

(65) Prior Publication Data

US 2023/0389056 A1 Nov. 30, 2023

Related U.S. Application Data

(63) Continuation of application No. PCT/CN2022/075685, filed on Feb. 9, 2022.

(30) Foreign Application Priority Data

Feb. 10, 2021 (CN) .......................... 202110184965.0

(51) Int. Cl.
*H04W 72/1263* (2023.01)
*H04L 1/1829* (2023.01)
(Continued)

(52) U.S. Cl.
CPC ........... *H04W 72/40* (2023.01); *H04L 5/0053* (2013.01)

(58) Field of Classification Search
CPC ....... H04W 72/40; H04W 72/25; H04W 4/70; H04W 72/1263; H04W 72/563; H04L 5/0053; H04L 5/0094
See application file for complete search history.

(56) References Cited

U.S. PATENT DOCUMENTS

| | | | |
|---|---|---|---|
| 2016/0219636 A1 | 7/2016 | Fujishiro et al. | |
| 2018/0359787 A1 | 12/2018 | Lee et al. | |
(Continued)

FOREIGN PATENT DOCUMENTS

| | | |
|---|---|---|
| CN | 110944390 A | 3/2020 |
| CN | 110972195 A | 4/2020 |
(Continued)

OTHER PUBLICATIONS

3GPP TSG RAN WG1 Meeting#104-e, R1-2101910 Title:Relianility and Latency Enhancement for Mode 2 (Year: 2021).*
VIVO, "Remaining Issues on Physical Layer Procedure for NR Sidelink," 3GPP TSG RAN WG1 #102-e, R1-2005344, e-Meeting, Aug. 17-28, 2020.
Sharp, "Remaining Issues on Physical Layer Structure for NR Sidelink," 3GPP TSG RAN WG1 Meeting #103-e, R1-2008387, e-Meeting, Oct. 26-Nov. 13, 2020.
(Continued)

*Primary Examiner* — Christopher M Crutchfield
*Assistant Examiner* — Abusayeed M Haque
(74) *Attorney, Agent, or Firm* — Price Heneveld LLP

(57) ABSTRACT

A conflict indication method and apparatus, and an electronic device are provided. The conflict indication method is performed by a first terminal, and the method includes: in a case that a resource or transmission conflict is determined, indicating the resource or transmission conflict to a second terminal, including any one of the following: transmitting conflict indication signaling to the second terminal; performing conflict indication through a physical sidelink channel PSxCH; and performing conflict indication through a physical sidelink feedback channel PSFCH resource corresponding to a resource under conflict.

14 Claims, 8 Drawing Sheets

In a case that a resource or transmission conflict is determined, indicate a resource or transmission conflict to a second terminal, including any one of the following:
transmitting conflict indication signaling to the second terminal;
performing conflict indication through a physical sidelink channel PSxCH; and
performing conflict indication through a physical sidelink feedback channel PSFCH resource corresponding to a resource under conflict

101

(51) Int. Cl.
    *H04L 5/00*        (2006.01)
    *H04W 72/40*    (2023.01)

(56) References Cited

U.S. PATENT DOCUMENTS

| | | | |
|---|---|---|---|
| 2020/0196255 A1 | 6/2020 | Cheng et al. | |
| 2021/0219170 A1 | 7/2021 | Ji et al. | |
| 2021/0250924 A1 | 8/2021 | Ji | |
| 2021/0298015 A1 | 9/2021 | Peng et al. | |
| 2022/0030556 A1 | 1/2022 | Zheng et al. | |
| 2022/0167376 A1* | 5/2022 | Ryu | H04W 72/20 |
| 2022/0225160 A1* | 7/2022 | Sarkis | H04W 28/0284 |

FOREIGN PATENT DOCUMENTS

| | | |
|---|---|---|
| CN | 111132329 A | 5/2020 |
| CN | 111194057 A | 5/2020 |
| CN | 111385845 A | 7/2020 |
| CN | 111615190 A | 9/2020 |
| CN | 111970095 A | 11/2020 |
| CN | 112235765 A | 1/2021 |
| EP | 3 672 133 A1 | 6/2020 |
| WO | 2015029954 A1 | 3/2015 |
| WO | 2017133446 A1 | 8/2017 |

OTHER PUBLICATIONS

Lenovo, Motorola Mobility, "Sidelink Resource Allocation for Reliability Enhancement," 3GPP TSG RAN WG1 #104-e, R1-2100767, e-Meeting, Jan. 25-Feb. 5, 2021.
Apple, "Inter-U Coordination for Mode 2 Resource Allocation," 3GPP TSG RAN WG1 #104-e, R1-2101358, e-Meeting, Jan. 25-Feb. 5, 2021.
Qualcomm Incorporated., "Reliability and Latency Enhancements for Mode 2," 3GPP TSG RAN WG1 Meeting #104-e, R1-2101910, (Jan. 25-Feb. 5, 2021).
International Search Report and Written Opinion of the International Searching Authority dated Apr. 22, 2022 as received in Application No. PCT/CN2022/075685.
CN Office Action dated Dec. 22, 2023 as received in Application No. 202110184965.0.
CATT, "Sidelink Physical Layer Structure in NR V2X," 3GPP TSG RAN WG1 Meeting #97, R1-1906314, Reno, Nevada, USA, May 13-17, 2019.
NTT DOCOMO, Inc., "Resource Allocation for Reliability and Latency Enhancements," 3GPP TSG RAN WG1 #104, R1-2101631, e-Meeting, Jan. 25-Feb. 5, 2021.
Korean Office Action for 10-2023-7030966, dated Aug. 6, 2025, 13 pages.

* cited by examiner

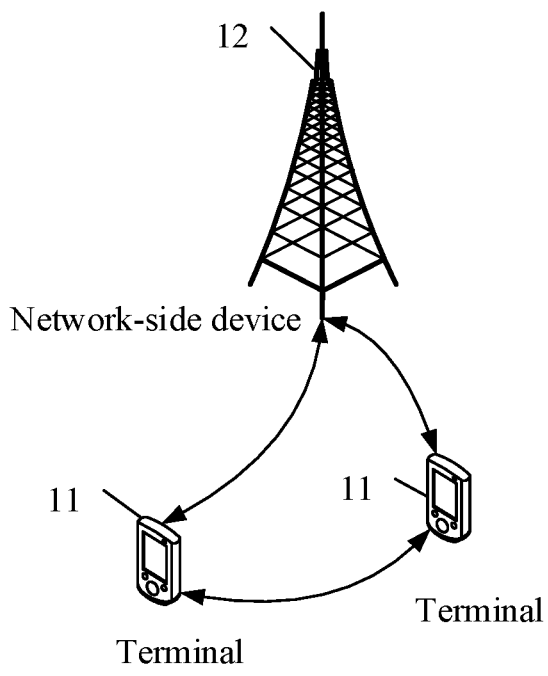

12

Network-side device 11    11

Terminal

Terminal

FIG. 1

In a case that a resource or transmission conflict is determined, indicate a
resource or transmission conflict to a second terminal, including any one
of the following:
transmitting conflict indication signaling to the second terminal;
performing conflict indication through a physical sidelink channel
PSxCH; and
performing conflict indication through a physical sidelink feedback
channel PSFCH resource corresponding to a resource under conflict

Step 201: Obtain, by performing any one of the following, conflict indication information indicated by a first terminal:
receiving conflict indication signaling from the first terminal;
monitoring a physical sidelink channel PSxCH corresponding to a physical sidelink control channel PSCCH transmit resource and/or a physical sidelink shared channel PSSCH transmit resource to obtain conflict indication information; and
monitoring a physical sidelink feedback channel PSFCH resource to obtain information of a resource under conflict

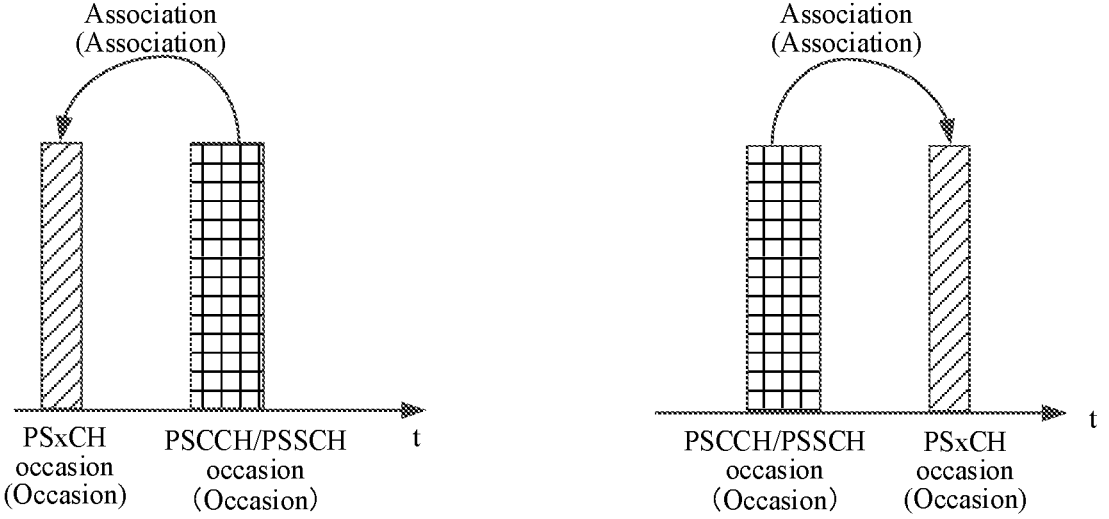

CONFLICT INDICATION METHOD AND APPARATUS, AND ELECTRONIC DEVICE

CROSS-REFERENCE TO RELATED APPLICATIONS

This application is continuation application of PCT International Application No. PCT/CN2022/075685 filed on Feb. 9, 2022, which claims priority to Chinese Patent Application No. 202110184965.0, filed in China on Feb. 10, 2021, the disclosures of which are incorporated herein by reference in its entireties.

TECHNICAL FIELD

This application relates to the field of communications technologies, and in particular, to a conflict indication method and apparatus, and an electronic device.

BACKGROUND

New radio (NR) sidelink (SL) mode 2 is a scheme based on autonomous resource selection by a terminal, which prevents the occurrence of resource or transmission conflicts by channel monitoring. However, the limitation of this scheme is that it cannot eliminate the problem of transmission resource or transmission conflicts.

SUMMARY

Embodiments of this application provide a conflict indication method and apparatus, and an electronic device.

According to a first aspect, an embodiment of this application provides a conflict indication method performed by a first terminal and including:

in a case that a resource or transmission conflict is determined, indicating a resource or transmission conflict to a second terminal, including any one of the following:

transmitting conflict indication signaling to the second terminal;

performing conflict indication through a physical sidelink channel PSxCH; and performing conflict indication through a physical sidelink feedback channel PSFCH resource corresponding to a resource under conflict.

According to a second aspect, an embodiment of this application provides a conflict indication method performed by a second terminal and including:

obtaining, by performing any one of the following, conflict indication information indicated by a first terminal:

receiving conflict indication signaling from the first terminal;

monitoring a physical sidelink channel PSxCH corresponding to a physical sidelink control channel PSCCH transmission resource and/or a physical sidelink shared channel PSSCH transmission resource to obtain conflict indication information; and monitoring a physical sidelink feedback channel PSFCH resource to obtain information of a resource under conflict.

According to a third aspect, an embodiment of this application provides a conflict indication apparatus applied to a first terminal and including:

a processing module configured to: in a case that a resource or transmission conflict is determined, indicate a resource or transmission conflict to a second terminal, including any one of the following:

transmitting conflict indication signaling to the second terminal;

performing conflict indication through a physical sidelink channel PSxCH; and performing conflict indication through a physical sidelink feedback channel PSFCH resource corresponding to a resource under conflict.

According to a fourth aspect, an embodiment of this application provides a conflict indication apparatus applied to a second terminal and including:

an obtaining module configured to obtain, by performing any one of the following, conflict indication information indicated by a first terminal:

receiving conflict indication signaling from the first terminal;

monitoring a physical sidelink channel PSxCH corresponding to a physical sidelink control channel PSCCH transmission resource and/or a physical sidelink shared channel PSSCH transmission resource to obtain conflict indication information; and monitoring a physical sidelink feedback channel PSFCH resource to obtain information of a resource under conflict.

According to a fifth aspect, an embodiment of this application further provides an electronic device including a processor, a memory, and a program or instructions stored in the memory and capable of running on the processor, where when the program or instructions are executed by the processor, the steps of the method according to the first aspect or the second aspect are implemented.

According to a sixth aspect, an embodiment of this application provides a readable storage medium, where the readable storage medium stores a program or instructions, and when the program or instructions are executed by a processor, the steps of the method according to the first aspect or the second aspect are implemented.

According to a seventh aspect, an embodiment of this application provides a chip, where the chip includes a processor and a communication interface, the communication interface is coupled to the processor, and the processor is configured to run a program or instructions to implement the method according to the first aspect or the second aspect.

According to an eighth aspect, a computer program product is provided, where the computer program product is stored in a non-transient storage medium, and the computer program product is executed by at least one processor so as to implement the method according to the first aspect or the second aspect.

According to a ninth aspect, a communication device is provided, where the communication device is configured to perform the method according to the first aspect or the second aspect.

In the embodiments of this application, after determining a resource or transmission conflict, the first terminal can indicate the resource or transmission conflict to the second terminal in a variety of ways such that the second terminal does not use a resource under conflict.

BRIEF DESCRIPTION OF DRAWINGS

FIG. 1 is a schematic diagram of a wireless communication system;

FIG. 2 is a schematic diagram of a conflict indication method for a first terminal according to an embodiment of the present invention;

FIG. 5 is a schematic diagram of a conflict indication method for a second terminal according to an embodiment of the present invention;

FIG. 6 is a schematic diagram of each PSCCH/PSSCH occasion corresponding to one PSxCH occasion;

DESCRIPTION OF EMBODIMENTS

Figure 3:
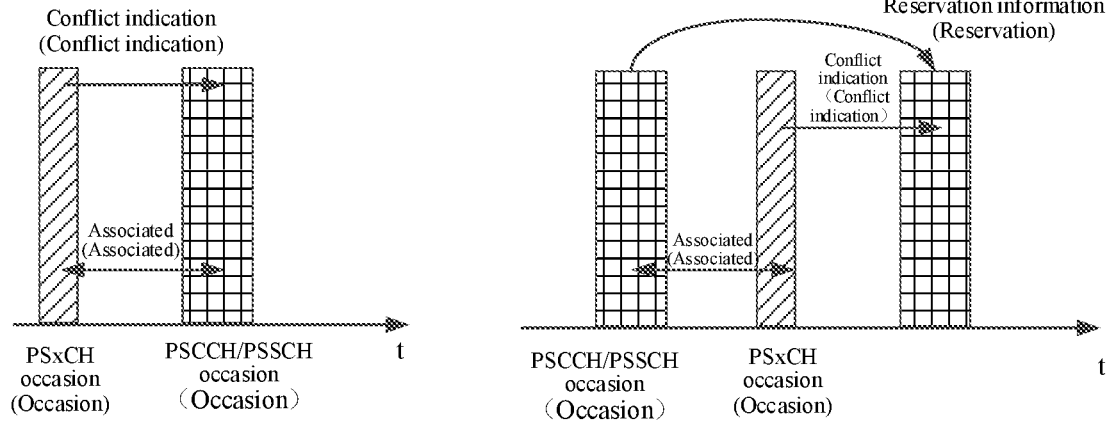
FIG. 3 is a schematic diagram of a PSxCH being associated with a PSCCH/PSSCH.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application fall within the protection scope of this application.

The terms "first", "second", and the like in this specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "and/or" in the specification and claims represents at least one of connected objects, and the character "/" generally indicates that the associated objects have an "or" relationship.

The technologies described in this specification are not limited to long term evolution (LTE) or LTE-Advanced (LTE-A) systems, and may also be used in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. A CDMA system can implement radio technologies such as CDMA2000 and universal terrestrial radio access (UTRA). UTRA includes wideband CDMA (WCDMA) and other CDMA variants. The TDMA system can implement radio technologies such as the global system for mobile communication (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, fast low-latency access with seamless hand off-orthogonal frequency division multiplexing, and fast low-latency access with seamless hand off-orthogonal frequency division multiplexing (Flash-OFDM). UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from the organization named "3rd generation partnership project" (3GPP). CDMA2000 and UMB are described in documents from the organization named "3rd generation partnership project 2" (3GPP2). Techniques described in this specification may be used in the aforementioned systems and radio technologies as well as other systems and radio technologies. In the following descriptions, an NR system is described for an illustration purpose, and NR terms are used in most of the following descriptions, however, these technologies may also be applied to other applications than an NR system application.

Examples provided in the following descriptions are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Referring to FIG. 1, FIG. 1 is a schematic diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that the terminal 11 is not limited to any specific type in the embodiments of this application. The network-side device 12 may be a base station or a core network. The base station may be a 5G base station and a base station of a later version (for example, a gNB or a 5G NR NB), or a base station in another communication system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless-fidelity (Wi-Fi) node, or another appropriate term in the art. As long as a same technical effect is achieved, the base station is not limited to a specific technical term. It should be noted that in the embodiments of this application, the base station in the NR system is merely used as an example, and a specific type of the base station and a specific communication system are not limited.

New radio (NR) sidelink (SL) control signaling includes a PC5-radio resource control (RRC) message, a media access control control unit (MAC CE), 1st sidelink control information (SCI) (in a physical sidelink control channel (PSCCH)), 2nd SCI (in a physical sidelink shared channel (PSSCH)), and sidelink feedback control information. (SFCI) (in a physical sidelink feedback channel (PSFCH)).

PC5-RRC is present between two UEs with an established unicast connection, belongs to higher-layer signaling, and has a relatively large signaling processing latency. PC5-RRE is suitable for control information transmission with a relatively large payload, is carried in a PSSCH resource, and has a flexible transmission time.

A MAC CE belongs to higher-layer signaling, whose signaling processing latency is relatively large but less than that of PC5-RRC. The MAC CE is suitable for control information transmission with larger payload, is carried in the PSSCH resource, and has a flexible transmission time.

1st SCI belongs to physical layer signaling and has a relatively small signaling processing latency. 1st SCI is mainly used for resource indication and/or reservation, and 2nd SCI carries several auxiliary control information related to transmission of a transport block (TB). In addition, SCI is suitable for transmission of control information with a large payload. The bearer channels PSCCH and PSSCH of SCI are usually bound together for transmission with flexible transmission time.

SFCI belongs to physical layer signaling and has a relatively small signaling processing latency. SFCI is only used for hybrid automatic repeat request-acknowledge (HARQ-ACK) transmission. SFCI usually has only 1 bit information and is carried in the PSFCH. In addition, the PSFCH is fixedly associated with the PSCCH and/or PSSCH with limited transmission flexibility.

The PSFCH channel is configured on an SL resource pool through periodicity and offset. The PSFCH channel occupies 1/2 symbol (symbols) and is located at the last second and third symbols of a slot. The symbol that precedes the PSFCH is an automatic gain control (AGC) symbol, and the symbol that follows the PSFCH is a gap.

A PSFCH resource includes a time domain resource, a frequency domain resource, and a code domain resource. The code domain uses Zadoff-Chu (ZC) sequence, and the code sequence generation depends on the cyclic shift (CS), u, and v, where u and v are the group identifier and sequence identifier of the ZC sequence respectively. The PSFCH resource carries 1 bit of information bit for ACK/NACK feedback.

The PSFCH resource has a fixed mapping relationship with the PSCCH and/or PSSCH. One or a plurality of PSCCH/PSSCH occasions may correspond to one PSFCH occasion. One PSCCH/PSSCH resource may correspond to a plurality of PSFCH resources. When performing PSFCH transmission, UE determines its corresponding plurality of PSFCH resources based on the received PSCCH/PSSCH resource and determines a transmitted PSFCH resource based on a user equipment identifier (UE ID).

For conflict detection, conflict removal, and conflict avoidance, a local UE may indicate a transmission conflict to an opposite UE by using conflict indication signaling.

From the resource utilization point of view, conflict indication signaling has small signaling overheads and is not suitable for transmission with the PSCCH/PSSCH. Instead, SFCI signaling is preferred. However, SFCI signaling currently does not support conflict indication and requires corresponding redesign and/or expansion.

From the transmission flexibility point of view, PC5-RRC, MAC CE, 1st SCI (in the PSCCH), and 2nd SCI (in the PSSCH) are more suitable for transmission of conflict indication signaling. If the conflict indication mode is complex, designing based on the signaling can also be considered.

An embodiment of this application provides a conflict indication method. As shown in FIG. 2, the method includes the following step.

Step 101: In a case that a resource or transmission conflict is determined, indicate a resource or transmission conflict to a second terminal, including any one of the following:

transmitting conflict indication signaling to the second terminal;

performing conflict indication through a physical sidelink channel PSxCH; and performing conflict indication through a physical sidelink feedback channel PSFCH resource corresponding to a resource under conflict. In the embodiments of this application, after determining a resource or transmission conflict, the first terminal can indicate the resource or transmission conflict to the second terminal in a variety of ways such that the second terminal does not use a resource under conflict, thereby avoiding a transmission resource or transmission conflict.

The first terminal may determine whether a resource or transmission conflict is present by detecting a resource under conflict, where the detecting a resource under conflict may be detecting whether a resource under conflict is present in a resource associated with the first terminal, for example, detecting whether at least one of a resource for SL transmission of the first terminal, a resource for SL reception and an uplink (UL) resource of the first terminal, and the like includes a resource under conflict.

In this embodiment of this application, the resource under conflict includes at least one of the following:

a conflict between SL resources; and a conflict between an SL resource and a non-SL resource.

The SL resource refers to a resource used for SL transmission, such as a PSCCH resource, a PSSCH resource, or a PSFCH resource.

The conflict between SL resources may be that a plurality of SL resources partially or completely overlap with each other.

The non-SL resource may be a resource for communication between the first terminal and a network device, for example, an uplink transmit resource (UL TX resource) or a downlink receive resource (DL RX resource). Or, the non-SL resource may be a Wi-Fi resource, a Bluetooth resource, a zigbee resource, or the like.

The conflict between an SL resource and a non-SL resource may be that the SL resource and the non-SL resource partially or completely overlap with each other.

It should be noted that in this embodiment of this application, a resource under conflict may be that at least two resources have resource overlap or potential resource overlap. Potential resource overlap means that at least two resources are detected as having resource overlap at one moment, but at some other moments may be detected as having no resource overlap. For example, some terminals have made a resource reselection, resulting in that before the reselection, there is a resource overlap; however, after the reselection, there may be no resource overlap. In addition, resource overlap or potential resource overlap may refer to partial or complete resource overlap in time, for example, the presence of a same slot/sub-slot/symbol/sub-frame; and resource overlap may also be frequency domain resource overlap or time frequency resource overlap.

In addition, in this embodiment of this application, a resource under conflict may also be called a collision resource under conflict.

After detecting a resource under conflict, the first terminal notifies the second terminal of information of the resource under conflict, such that the second terminal selects an SL resource that does not overlap with a resource of the first terminal or selects an SL resource that does not overlap with a feedback resource corresponding to a resource of the first terminal.

In an optional implementation, the detecting a resource under conflict includes:

detecting, by the first terminal, a resource under conflict based on resource information;

where the resource information is used to represent at least one of the following:

a resource of the first terminal, a resource of at least one second terminal.

The resource of the first terminal may be a resource selected by the first terminal, a resource reserved by the first terminal, or a resource to be occupied by the first terminal, for example, a resource selected by the first terminal for SL transmission. The resource of the second terminal may be a resource selected by the second terminal, a resource reserved by the second terminal, or a resource to be occupied by the second terminal, for example, a resource selected by the second terminal for SL transmission.

The resource of the at least one second terminal may be a resource notified by the second terminal by using signaling. For example, after selecting a resource, the second terminal notifies the first terminal of the resource selected by the second terminal either by using broadcast signaling or using unicast signaling.

The detecting, by the first terminal, a resource under conflict based on resource information may be detecting whether a resource under conflict is present in resources of the first terminal, or detecting whether a resource under conflict is present between a resource of the first terminal and the resource of the at least one second terminal.

In this implementation, the presence of a resource under conflict can be accurately detected based on resource information.

Optionally, the detecting, by the first terminal, a resource under conflict based on resource information includes:

detecting, by the first terminal, a resource under conflict based on the resource information and at least one identifier of the second terminal.

The at least one identifier of the second terminal may be used to identify the second terminal corresponding to a resource, such that the second terminal having a resource or transmission conflict with the first terminal can be accurately identified by using the resource information and the at least one identifier of the second terminal to further improve the detection effect.

Optionally, the resource of the at lease on second terminal includes:

the resource of the at least one second terminal determined by using SL control information received by the first terminal, where the SL control information includes at least one of the following:

resource reservation information, and a terminal identifier associated with a reserved resource.

The resource reservation information may be PSCCH/PSSCH resource reservation information, and the terminal identifier associated with a reserved resource may be a destination identifier (destination ID) of the reserved resource or a source identifier (source ID) of the reserved resource. The reserved resource may include an aperiodically reserved resource and/or a periodically reserved resource.

In this implementation, the resource of the at least one second terminal can be accurately determined based on the SL control information.

In addition, the SL control information may be SL control information obtained by demodulating at least one of a PSCCH and a PSSCH.

For example, in a case that the second terminal is a transmit end that transmits a PSCCH/PSSCH to the first terminal, the first terminal demodulates the SL control information transmitted by the second terminal to obtain PSCCH/PSSCH resource reservation information and a target identifier associated with the PSCCH/PSSCH resource to determine whether the PSCCH/PSSCH of the PSCCH/PSSCH resource is transmitted to the first terminal. For example, the first terminal demodulates a first channel state information field ($1^{st}$ stage SCI) in the SL control information (for example, a PSCCH) to obtain resource reservation information; and demodulates a second channel state information field ($2^{nd}$ stage SCI) in the PSSCH to obtain a target identifier associated with the resource to determine whether the resource is transmitted to the first terminal.

It should be noted that in this embodiment of this application, an aperiodically reserved resource may be associated with a corresponding terminal, that is, a target terminal of the resource transmission can be determined using the aperiodically reserved resource, and thus a target identifier may not be carried in SL control information. Certainly, in this embodiment of this application, a periodically reserved resource may also be associated with a corresponding terminal in some scenarios, that is, a target terminal of the resource transmission can be determined using the periodically reserved resource. In addition, in this embodiment of this application, whether information transmitted on an aperiodically reserved resource or a periodically reserved resource is transmitted to the first terminal can be known based on a target identifier. Certainly, a joint judgment made in combination with a higher-layer target identifier is not excluded. This is not limited in this embodiment of this application.

For another example, in a case that the second terminal is a receive end that receives a PSCCH/PSSCH transmitted by the first terminal, the first terminal demodulates the SL control information to obtain PSCCH/PSSCH resource reservation information and a source identifier associated with the resource to determine whether the PSCCH/PSSCH corresponding to the PSCCH/PSSCH resource originates from the second terminal. For example, a first channel state information field ($1^{st}$ stage SCI) in the PSCCH is demodulated to obtain resource reservation information, where a reserved resource may include an aperiodically reserved resource and/or a periodically reserved resource, and at least for the aperiodically reserved resource, it may be determined whether the reserved resource originates from the first terminal; and in addition, a second channel state information field ($2^{nd}$ stage SCI) in the PSSCH may be demodulated to obtain a source identifier associated with the reserved resource to determine whether the reserved resource originates from the first terminal. For example, at least from the source identifier, it can be known that information transmission on the aperiodically reserved resource comes from the first terminal. Certainly, a joint judgment made in combination with a higher-layer source identifier is not excluded. This is not limited in this embodiment of this application.

It should be noted that in this embodiment of this application, using SL control information to determine the resource of the at least one second terminal is not limited, for example, in some scenarios, the resource of the at least one second terminal may also be known by using higher-layer signaling.

Optionally, it is determined that a transmission conflict is present in at least one of the following cases:

The first terminal needs to receive a transport block (TB) on the resource under conflict.

The first terminal needs to transmit a TB on the resource under conflict.

The first terminal needs to receive HARQ feedback on the resource under conflict.

The first terminal needs to transmit HARQ feedback on the resource under conflict.

The TB is a TB corresponding to the resource under conflict, and the HARQ feedback is HARQ feedback corresponding to the resource under conflict.

The TB corresponding to the resource under conflict may be the following: in a case that the resource under conflict is a PSCCH/PSSCH resource, the TB is a TB that needs to be transmitted on the PSCCH/PSSCH resource; or in a case that the resource under conflict is a PSFCH resource, the TB is a TB that is transmitted on the PSCCH/PSSCH that causes the PSFCH resource or transmission conflict.

The HARQ feedback corresponding to the resource under conflict may be HARQ feedback that needs to be performed on the resource under conflict.

The receiving a TB is receiving a TB transmitted by the second terminal; the transmitting a TB is transmitting a TB to the second terminal; the receiving HARQ feedback is receiving HARQ feedback transmitted by the second terminal; and the transmitting HARQ feedback is transmitting HARQ feedback to the second terminal.

That the first terminal needs to receive a TB on the resource under conflict may be that the first terminal determines that it cannot successfully demodulate the TB before the resource under conflict. Therefore, the first terminal needs to continue to perform reception on the resource under conflict, and the conflict is actually present, that is, there is a transmission conflict as described above. Alternatively, that the first terminal needs to receive a TB on the resource under conflict may be that the first terminal cannot determine whether it has successfully demodulated the TB (for example, there is still a TB transmission resource to be used) before the resource under conflict, then the first terminal may need to continue to perform reception on the resource under conflict. Specifically, whether the first terminal needs to continue to perform reception on the resource under conflict depends on a protocol agreement/configuration/pre-configuration/judgment of the first terminal. In other words, the presence of the transmission conflict depends on the protocol agreement/configuration/pre-configuration/judgment of the first terminal if the first terminal cannot determine whether it has successfully demodulated the TB before the resource under conflict.

That the first terminal needs to transmit a TB on the resource under conflict may be that the first terminal cannot successfully transmit the TB before the resource under conflict, and the first terminal needs to continue to transmit on the resource under conflict, resulting in the presence of a transmission conflict, for example, the presence of a PSSCH transmit (PSSCH TX) and PSSCH receive (PSSCH RX)

duplex conflict, or actual presence of a PSFCH transmit (PSFCH TXs) and PSFCH receive (PSFCH RX) duplex conflict.

Alternatively, that the first terminal needs to transmit a TB on the resource under conflict may be that the first terminal cannot determine whether it has successfully transmitted the TB (there is still a TB transmission resource to be used) before the resource under conflict, then the first terminal determines to continue to perform transmission on the resource under conflict according to a protocol agreement/configuration/pre-configuration/judgment of the first terminal, resulting in the presence of a transmission conflict. In other words, the presence of the transmission conflict depends on the protocol agreement/configuration/pre-configuration/judgment of the first terminal if the first terminal cannot determine whether it has successfully transmitted the TB before the resource under conflict.

In addition, the first terminal can determine whether it has successfully transmitted the TB by using the HARQ feedback state. For example, for unicast or groupcast (unicast/groupcast), when an ACK is received, it can be determined that the TB is successfully transmitted; and for groupcast, in some scenarios, when no NACK is received, it can be determined that the TB is successfully transmitted.

That the first terminal needs to receive or transmit HARQ feedback on the resource under conflict may be that, for a PSFCH transmit and receive duplex conflict, the first terminal determines whether HARQ feedback is enabled for TB transmission on a PSSCH resource of the conflict, or whether HARQ-ACK/NACK feedback is required for the TB. If HARQ-ACK/NACK feedback is enabled or is required for the TB, as a transmit end, the terminal needs to receive HARQ feedback; and as a receive end, the terminal needs to transmit HARQ feedback.

Optionally, it is determined that no transmission conflict is present in one of the following cases:

The first terminal has successfully demodulated a TB before the resource under conflict.

The first terminal can successfully transmit a TB before the resource under conflict.

The first terminal does not need to receive HARQ feedback on the resource under conflict.

The first terminal does not need to transmit HARQ feedback on the resource under conflict.

The TB is a TB corresponding to the resource under conflict, and the HARQ feedback is HARQ feedback corresponding to the resource under conflict.

In this implementation, if the first terminal has successfully demodulated a TB before the resource under conflict, it is determined that no actual conflict is present, that is, there is no transmission conflict as described above. For example, when the first terminal performs TB reception, one of a plurality of TB transmissions is performed on a conflict PSCCH/PSSCH resource or on a PSCCH/PSSCH that causes a PSFCH conflict. If the UE has successfully demodulated a TB before the resource under conflict, the first terminal does not need to continue to perform reception on the resource under conflict, and then the conflict is actually not present.

In this implementation, if the first terminal can successfully transmit a TB before the resource under conflict, it is determined that no actual conflict is present, that is, there is no transmission conflict as described above. For example, when the first terminal performs TB transmission, one of a plurality of TB transmissions is performed on the resource under conflict or on a PSCCH/PSSCH that causes a PSFCH conflict. If the first terminal can successfully transmit the TB before the resource under conflict, the first terminal does not need to continue performing transmission on the resource under conflict, and then the conflict is actually not present.

That the first terminal does not need to receive or transmit HARQ feedback on the resource under conflict may be that, for a PSFCH transmit and receive duplex conflict, the first terminal determines whether HARQ feedback is enabled for TB transmission on a PSSCH resource of the conflict, or whether HARQ-ACK/NACK feedback is required for the TB; and if HARQ feedback is not enabled/HARQ-ACK/NACK is not allowed, the conflict is actually not present, that is, there is no transmission conflict as described above.

In an optional implementation, the detecting a resource under conflict includes:

detecting a resource under conflict at a target time; or detecting a resource under conflict at a plurality of times including the target time;

where the target time may be one or more times as defined by a protocol, pre-configured, or indicated by a network.

At the target time, at least one of the following may be performed:

detecting a resource under conflict;

detecting whether a transmission conflict is present;

detecting a transmission type of the resource under conflict;

detecting a priority of transmission information of the resource under conflict;

detecting whether a transmission resource is present for a TB corresponding to the resource under conflict after the resource under conflict; and detecting whether the first terminal can transmit a plurality of PSFCHs on the resource under conflict, or whether at least one PSFCH of the first terminal on the resource under conflict has transmit power lower than or equal to a threshold value.

Optionally, the target time includes at least one of the following:

a T1 time prior to a resource indication of an SL resource of the first terminal;

a time preceding a T1 time prior to a resource indication of an SL resource of the first terminal;

a T1 time prior to reservation of an SL resource of the first terminal;

a time preceding a T1 time prior to reservation of an SL resource of the first terminal;

a T2 time prior to an SL resource of the first terminal;

a time preceding a T2 time prior to an SL resource of the first terminal;

a T3 time prior to an SL resource of the second terminal;

a time preceding a T3 time prior to an SL resource of the second terminal;

a T3 time after transmission of reserved indication signaling of an SL resource of the second terminal;

a time after transmission of reserved indication signaling of an SL resource of the second terminal and within a T3 time after transmission of reserved indication signaling of the SL resource of the second terminal;

a T4 time prior to transmission of conflict indication signaling associated with an SL resource of the second terminal; and a time preceding a T4 time prior to transmission of conflict indication signaling associated with an SL resource of the second terminal;

where the SL resource of the second terminal is a resource for SL transmission from the second terminal to the first terminal, and the T1, T2, T3, and T4 denote a same or different time resources respectively.

It should be noted that the T1, T2, T3, and T4 may be protocol-defined, pre-configured, or network-indicated time resources. For example, the T1, T2, T3, and T4 respectively denote a same or different number of slots/sub-slots/symbols/sub-frames, and the like. In addition, T1, T2, T3, and T4 may include the processing time of the terminal. For example, the T1, T2, T3, and T4 may be a time domain resource larger than the processing time of the terminal.

In this implementation, it is possible to achieve the detection of a resource under conflict by the terminal at the above-mentioned target times, and whether the detection is performed at other times may be determined by the first terminal, agreed by protocol, or configured by a network. For example, the first terminal may always perform conflict detection, the first terminal may decide when to perform conflict detection based on the terminal implementation, or the first terminal may perform conflict detection at a time specified by a protocol/configured by a control node/pre-configured/, and/or perform conflict detection at other times.

In some embodiments, the conflict indication signaling uses any one of the following:

sidelink control information SCI;

media access control MAC control element CE;

channel state information CSI;

sidelink feedback control information SFCI; and sidelink reference signal, for example demodulation reference signal (DMRS), channel state information reference signal (CSI-RS), and phase tracking reference signal (PT-RS).

A transmission time of conflict indication signaling needs to be regulated.

In some embodiments, a first time at which the conflict indication signaling is transmitted satisfies any one of the following:

being after a second time and having an interval to the second time less than a first threshold or not greater than the first threshold, where the second time is a time at which the resource or transmission conflict is detected, that is, the terminal needs to transmit the conflict indication signaling within a restricted time after detection of the conflict;

being before the resource under conflict and having an interval to a time at which the resource under conflict is present greater than a second threshold or not less than the second threshold; and being before a third time and having an interval to the third time greater than a third threshold or not less than the third threshold, where the third time is a time at which reserved indication signaling or indication signaling for the resource under conflict is transmitted.

Determining factors of the second threshold include at least one of demodulation duration of signaling, processing duration of resource reselection, and transmit-receive transition duration.

Determining factors of the third threshold include at least one of demodulation duration of signaling, processing duration of resource reselection, and transmit-receive transition duration.

In some embodiments, a PSxCH resource includes at least one of a time domain resource, a frequency domain resource, and a code domain resource.

The time domain resource includes L time domain basic units predefined by a protocol, configured by a control node, or pre-configured, L being a positive integer; where the time domain basic units include symbols, slots, and sub-slots; and the L time domain basic units may be L continuous time domain basic units. For example, the time domain resource includes 1 symbol or 2 contiguous symbols.

The frequency domain resource includes F frequency domain basic units predefined by a protocol, configured by a control node, or pre-configured, F being a positive integer; where the frequency domain basic unit may be a physical resource block (PRB), a sub-carrier sub-carrier, or a sub-channel sub-channel; and the F frequency domain basic units may be F contiguous frequency domain basic units. For example, the frequency domain basic unit may be 1 physical resource block or 2 physical resource blocks.

The code domain resource includes C code sequences predefined by a protocol, configured by a control node, or pre-configured, or is a code sequence generated according to a sequence generation rule predefined by a protocol, configured by a control node, or pre-configured, C being a positive integer. For example, a ZC sequence is used, and a set of code sequences is generated by a combination of CS, u, and v. A distinguishing parameter of the C code sequences may be one or more of CS, u, and v. Typically, different code sequences are distinguished by CS, and the C code sequences may also be fixed grouping sequences.

In some embodiments, state information of the PSxCH is expressed using any one of the following:

at least one of a time domain basic unit, a frequency domain basic unit, and a code sequence; and a coded bit, where if a PSxCH resource does not include a code domain resource, the PSxCH state information may be expressed using the coded bit.

In some embodiments, the PSxCH channel includes X PSxCH occasions occasion in time domain, the PSxCH occasion includes Y PSxCH frequency domain resources, and the PSxCH channel includes Z code domain resources, X, Y, and Z being positive integers.

A typical value of X is 1. A position of a PSxCH occasion on a slot may be specified by a protocol, configured by a control node, or pre-configured, and a typical position is a time domain position of the PSFCH channel. A period and a starting position in a system frame number (SFN) and/or direct frame number (DFN) of a PSxCH occasion may be configured by a protocol, configured by a control node, or pre-configured.

A PSxCH occasion includes Y PSxCH frequency domain resources, where Y≥1. For example, PRBs occupied by a PSxCH occasion may be indicated by a bitmap, or PRBs occupied by a PSxCH occasion may be indicated in a mode of start position+length. A typical indication mode is the same as the indication mode of a PSFCH channel.

A PSxCH channel includes Z code domain resources, where Z≥1. For example, a total number of code sequences can be indicated, and thus the number of code domain resources can be deduced.

Optionally, a PSxCH occasion may be divided into a plurality of PSxCH resource subsets. If a PSCCH/PSSCH resource can be associated with a plurality of PSxCH occasions, for the associated PSxCH occasions at different positions, the PSCCH/PSSCH resource needs to be associated with different resource subsets corresponding to the PSxCH occasion. In other words, for each PSxCH occasion associated, the PSCCH/PSSCH resource needs to be associated with a specific resource subset corresponding to the PSxCH occasion to prevent a plurality of PSCCHs/PSSCHs from being associated with a same PSxCH resource.

In some embodiments, A time domain basic units before the PSxCH occasion are used to transmit an automatic gain control AGC (AGC) signal, for example, 1 symbol before the PSxCH occasion is used to transmit the AGC signal. In this way, the terminal transmits the ACG signal before transmitting the PSxCH resource, and the A time domain basic units are adjacent to the PSxCH occasion.

The frequency domain width of the signal is equal to the PSxCH frequency domain resource to be transmitted, and/or the power or power spectral density (PSD) of the signal transmission is equal to the power or PSD of the PSxCH resource transmission, and/or the signal may replicate a portion of the PSxCH, for example, the signal of the 1st or nth symbol of the PSxCH is replicated to the ACG symbol transmission.

In some embodiments, the PSxCH is multiplexed with a PSCCH and/or a PSSCH using at least one of the following:

time division multiplexing (TDM), where the symbols occupied by the PSCCH/PSSCH do not include the symbols occupied by the PSxCH/AGC; or if the PSCCH/PSSCH transmission overlaps with the PSxCH channel/PSxCH transmission/AGC, the puncturing/rate matching operation is performed on the PSCCH/PSSCH; and frequency division multiplexing (FDM).

In some embodiments, the PSxCH is multiplexed with a PSFCH using at least one of the following:

FDM, where the PSxCH occasion overlaps the PSFCH occasion, the time domain (pre)configuration of the PSxCH channel is multiplexed with the time domain (pre)configuration of the PSFCH channel, and/or, the code domain (pre)configuration is multiplexed with the time domain (pre)configuration of the PSFCH channel;

space division multiplexing (SDM), where the time-frequency domains of PSxCH and PSFCH overlap and the time-frequency domain (pre)configuration of the PSxCH channel is multiplexed with the time-frequency domain (pre)configuration of the PSFCH channel; and

TDM.

In some embodiments, as shown in FIG. 3, a PSxCH resource is associated with a physical sidelink control channel PSCCH resource and/or a physical sidelink shared channel PSSCH resource, where Conflict indication is a conflict indication and Reservation is reservation information.

In some embodiments, as shown in the left half of FIG. 3, conflict information carried on the PSxCH indicates that a PSCCH and/or PSSCH resource associated with a PSxCH resource encounters a conflict; or conflict information carried on the PSxCH indicates that a PSFCH corresponding to a PSCCH and/or PSSCH resource associated with a PSxCH resource encounters a conflict.

A protocol may only support indicating one of PSSCH and PSFCH conflicts, or a protocol supports indicating PSSCH and PSFCH conflicts. For example, different information state values of the PSxCH indicate a PSCCH conflict and a PSFCH conflict respectively; or a same information state indicates a PSCCH conflict or a PSFCH conflict.

In some embodiments, as shown in the right half of FIG. 3, conflict information carried on the PSxCH indicates that a PSCCH and/or PSSCH resource reserved for a PSCCH and/or PSSCH resource associated with a PSxCH resource encounters a conflict; or conflict information carried on the PSxCH indicates that a PSFCH corresponding to a PSCCH and/or PSSCH resource reserved for a PSCCH and/or PSSCH resource associated with a PSxCH resource encounters a conflict.

A protocol may only support indicating that the PSCCH/ PSSCH resource, reserved using reservation information of one or some preset categories, encounters/causes a conflict. For example, the conflict information indicates that a PSCCH and/or PSSCH resource reserved using a preset category of reservation information encounters a conflict, for example, periodical reservation, aperiodic reservation, a first aperiodically reserved PSCCH/PSSCH, a second aperiodically reserved PSCCH/PSSCH, a first in the next period of periodically reserved PSCCH/PSSCH, and a second in the next period of periodically reserved PSCCH/PSSCH. This can indicate the occurrence of a conflict earlier so that UE can take action earlier, for example, more time can be left for the UE for resource selection.

In addition, the state information in the PSxCH additionally carries HARQ-ACK feedback information and the PSxCH is in New PSFCH format.

In some embodiments, the PSxCH resource has a time-domain association with the PSCCH and/or PSSCH resource, including any one of the following:

one PSCCH or PSSCH occasion being associated with one PSxCH occasion, such that the design of the PSFCH can be reused to the maximum extent;

a plurality of PSCCH and/or PSSCH occasions being associated with one PSxCH occasion, such that the design of the PSFCH can be reused to the maximum extent;

one PSCCH or PSSCH occasion being associated with a plurality of PSxCH occasions; and a plurality of PSCCH and/or PSSCH occasions being associated with a plurality of PSxCH occasions.

The plurality of PSCCH and/or PSSCH occasions may be a plurality of PSCCH and/or PSSCH occasions of consecutive occurrence.

In some embodiments, in the case that one PSCCH or PSSCH occasion is associated with a plurality of PSxCH occasions; or that a plurality of PSCCH and/or PSSCH occasions are associated with a plurality of PSxCH occasions, for the plurality of PSxCH occasions, one PSxCH resource subset in the PSxCH occasions corresponds to the one PSCCH or PSSCH occasion or corresponds to the plurality of PSCCH and/or PSSCH occasions.

In some embodiments, in the case that one PSCCH or PSSCH occasion is associated with a plurality of PSxCH occasions; or that a plurality of PSCCH and/or PSSCH occasions are associated with a plurality of PSxCH occasions, content indicated by indication information carried by each PSxCH occasion in the plurality of associated PSxCH occasions is independently specified.

In some embodiments, an associated PSxCH occasion before a PSCCH and/or PSSCH at least indicates whether the PSCCH and/or PSSCH encounters a conflict, and an associated PSxCH occasion after a PSCCH and/or PSSCH at least indicates whether a PSCCH and/or PSSCH reserved for the PSCCH and/or PSSCH encounters a conflict.

In some embodiments, according to content carried by PSxCH information, in a case that multiple types of conflict information is present, each type of conflict information of a PSCCH or PSSCH is individually mapped to one PSxCH occasion.

Figure 4:
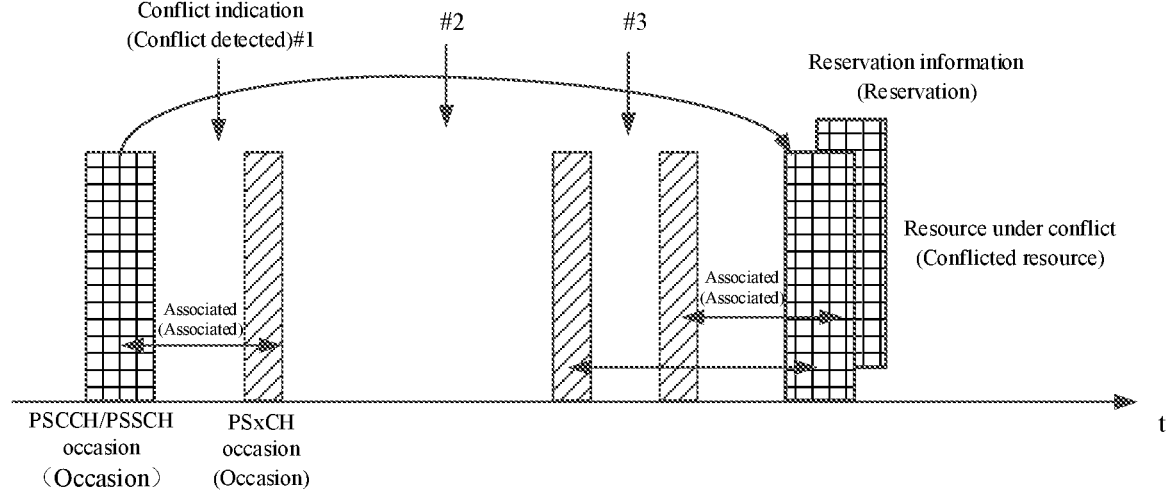
FIG. 4 is a schematic diagram of indicating a resource or transmission conflict according to an embodiment of the present invention.

Compared with the "one or more PSCCH or PSSCH occasions are associated with one PSxCH occasion" scenario, the "one or more PSCCH or PSSCH occasions are associated with a plurality of PSxCH occasions" scenario has more flexibility as to a position for transmitting conflict indication information and can indicate a conflict in a timely manner. For example, the resource or transmission conflicts detected at positions #1, #2, and #3 in FIG. 4 can be indicated at any time.

In some embodiments, a time interval, minimum time interval, or maximum time interval between a PSCCH and/or PSSCH occasion and an associated PSxCH occasion is K, K being a duration predefined by a protocol, configured by a control node, or pre-configured.

In some embodiments, a PSCCH and/or PSSCH occasion precedes an associated PSxCH occasion; or a PSCCH and/or PSSCH occasion follows an associated PSxCH occasion.

The above content may be predefined by a protocol, configured by a control node, or pre-configured. Optionally, if each PSCCH/PSSCH is associated with a plurality of PSxCH occasions, all of the associated PSxCH occasions precede the PSCCH/PSSCH, follow the PSCCH/PSSCH, partially precede the PSCCH/PSSCH, or partially follow the PSCCH/PSSCH.

In some embodiments, a resource on a PSCCH and/or PSSCH occasion corresponding to a PSxCH occasion is numbered; and a PSxCH resource on a PSxCH occasion is numbered; where each numbered PSCCH or PSSCH resource corresponds to one or more numbered PSxCH resources.

In some embodiments, a PSxCH occasion associated with a PSCCH and/or PSSCH resource is associated with a PSFCH occasion associated with the PSCCH and/or PSSCH resource.

In some embodiments, the PSxCH occasion associated with the PSCCH and/or PSSCH resource is within a same slot slot or a same symbol symbol in a same slot as the PSFCH occasion associated with the PSCCH and/or PSSCH resource.

In some embodiments, the PSxCH occasion associated with the PSCCH and/or PSSCH resource precedes the PSFCH occasion associated with the PSCCH and/or PSSCH resource; or the PSxCH occasion associated with the PSCCH and/or PSSCH resource follows the PSFCH occasion associated with the PSCCH and/or PSSCH resource.

The above content may be predefined by a protocol, configured by a control node, or pre-configured. For example, the PSxCH occasion associated with the PSCCH and/or PSSCH resource is the P-th PSFCH occasion that follows the PSFCH occasion associated with the PSCCH and/or PSSCH resource.

In some embodiments, the PSxCH occasion associated with the PSCCH and/or PSSCH resource and the PSFCH occasion associated with the PSCCH and/or PSSCH resource are TDMed.

In some embodiments, state information of the PSxCH carries HARQ-ACK feedback information.

In some embodiments, the method further includes determining a PSxCH transmit resource, where the determining a PSxCH transmit resource includes:

determining a target PSCCH and/or PSSCH resource;

determining a target PSxCH resource, the target PSxCH resource being associated with the target PSCCH and/or PSSCH resource; and selecting at least one PSxCH from the at least one target PSxCH resource for transmission.

In some embodiments, the target PSCCH and/or PSSCH resource is a PSCCH and/or PSSCH resource that encounters a conflict; or the target PSCCH and/or PSSCH resource is a PSCCH and/or PSSCH resource that causes a PSFCH conflict; and the target PSCCH and/or PSSCH resource is a third-party PSCCH and/or PSSCH resource, and the PSCCH and/or PSSCH resource that encounters a conflict is reserved for the third-party PSCCH and/or PSSCH resource; or the target PSCCH and/or PSSCH resource is a third-party PSCCH and/or PSSCH resource, and the PSCCH and/or PSSCH resource that causes a PSFCH conflict is reserved for the third-party PSCCH and/or PSSCH resource.

In some embodiments, in a case that the target PSCCH and/or PSSCH resource includes a plurality of resources, the target PSxCH resource is:

all PSxCH resources corresponding to the plurality of resources; or a PSxCH resource corresponding to one of the plurality of resources, the one resource being a resource with a largest time domain number, a smallest time domain number, a largest frequency domain number, or a smallest frequency domain number in the plurality of resources.

In some embodiments, in a case that the target PSCCH and/or PSSCH resource corresponds to a plurality of PSxCH occasions, the target PSxCH resource in at least one PSxCH occasion is selected.

In some embodiments, one PSxCH occasion is selected based on content indicated in the PSxCH occasion, for example, a resource in the selected PSxCH occasion may indicate the conflict; or at least one PSxCH occasion is selected based on an occurrence time of the PSxCH occasion, for example, one or more PSxCH occasions closest to the current detecting time are selected, or a PSxCH occasion closest to the target PSCCH/PSSCH resource is selected, which may be limited to be located before or after the target PSCCH/PSSCH resource.

In some embodiments, the selecting at least one PSxCH from at least one target PSxCH resource for transmission includes any one of the following:

selecting a PSxCH transmission resource based on a terminal identifier, for example, in a case that the number of target PSxCH resources is Q (sequentially numbered), UE uses the q-th PSxCH resource for transmission, q being UE ID mod Q, where the UE ID may be a UE ID of a target counterpart of 'trigger or notification' signaling and/or a local UE ID for transmitting the PSxCH; and selecting a PSxCH transmission resource based on a zone identifier, where the zone ID may be a zone ID of a target counterpart of 'trigger or notification' and/or a local zone ID for transmitting the PSxCH.

In some embodiments, in a case that a PSxCH transmit/receive conflict occurs, any one of the following is performed:

abandoning reception of the PSxCH or transmission of the PSxCH according to a rule predefined by a protocol;

abandoning reception of the PSxCH or transmission of the PSxCH according to a pre-configured rule;

abandoning reception of the PSxCH or transmission of the PSxCH according to a rule configured by a control node; and abandoning reception of the PSxCH or transmission of the PSxCH based on a priority of a PSCCH and/or PSSCH resource associated with the PSxCH, for example, the one with a lower priority may be abandoned.

In some embodiments, if a plurality of transmitted PSxCHs are under conflict, in case of power limitation, transmission of one or more PSxCHs is abandoned based on priorities of PSCCH and/or PSSCH resources associated with the PSxCHs, for example, the one with a lower priority may be abandoned; and in case of no power limitation, the plurality of PSxCHs are transmitted with equal power, or transmit power of the plurality of PSxCHs is determined based on priorities of PSCCH and/or PSSCH resources associated with the PSxCHs, for example, the transmit power of the one with a lower priority is lower than the transmit power of the one with a higher priority.

In some embodiments, in a case that transmission of the PSxCH conflicts with reception of a PSFCH, at least one of the following is performed:

abandoning transmission of the PSxCH or reception of the PSFCH according to a rule predefined in a protocol;

abandoning transmission of the PSxCH or reception of the PSFCH according to a pre-configured rule;

abandoning transmission of the PSxCH or reception of the PSFCH according to a rule configured by a control node; and transmitting the PSxCH or receiving the PSFCH based on a priority of a PSCCH and/or PSSCH resource associated with the PSxCH, for example, the one with a lower priority may be abandoned.

The above rule may be that the priority of the PSCCH and/or PSSCH resource associated with the PSxCH is above a threshold for PSxCH transmission, otherwise PSxCH transmission is abandoned.

In some embodiments, in a case that reception of the PSxCH conflicts with transmission of a PSFCH, at least one of the following is performed:

abandoning reception of the PSxCH or transmission of the PSFCH according to a rule predefined by a protocol;

abandoning reception of the PSxCH or transmission of the PSFCH according to a pre-configured rule;

abandoning reception of the PSxCH or transmission of the PSFCH according to a rule configured by a control node; and receiving the PSxCH or transmitting the PSFCH based on a priority of a PSCCH and/or PSSCH resource associated with the PSxCH, for example, the one with a lower priority may be abandoned.

The above rule may be that the priority of the PSCCH and/or PSSCH resource associated with the PSxCH is above a threshold for PSxCH reception, otherwise PSxCH reception is abandoned.

In some embodiments, in a case that transmission of the PSxCH conflicts with transmission of a PSFCH, in case of power limitation, at least one of the following is performed:

discarding the PSxCH or PSFCH according to a rule predefined by a protocol, configured by a control node, or pre-configured;

transmitting the PSxCH or PSFCH based on a priority of a PSCCH and/or PSSCH resource associated with the PSxCH, for example, the one with a higher priority is transmitted in priority; and in case of no power limitation, transmitting a plurality of PSxCHs and PSFCHs with equal power, or determining transmit power of the PSxCHs based on priorities of PSCCH and/or PSSCH resources associated with the PSxCHs, for example, the transmit power of the one with a lower priority is lower than the transmit power of the one with a higher priority.

The above rule may be that the priority of the PSCCH and/or PSSCH resource associated with the PSxCH is above a threshold for PSxCH transmission, otherwise PSxCH transmission is abandoned.

In some embodiments, the performing conflict indication through a physical sidelink feedback channel PSFCH resource corresponding to a resource under conflict:

reporting negative acknowledgement NACK on the PSFCH corresponding to the resource under conflict.

An embodiment of the present invention further provides a conflict indication method performed by a second terminal. As shown in FIG. 5, the method includes the following step.

Step 201: Obtain, by performing any one of the following, conflict indication information indicated by a first terminal:

receiving conflict indication signaling from the first terminal;

monitoring a physical sidelink channel PSxCH corresponding to a physical sidelink control channel PSCCH transmission resource and/or a physical sidelink shared channel PSSCH transmission resource to obtain conflict indication information; and monitoring a physical sidelink feedback channel PSFCH resource to obtain information of a resource under conflict.

UE performs PSCCH/PSSCH transmission, and the UE monitors at least a PSxCH resource corresponding to its PSCCH/PSSCH transmission resource to monitor conflict indication information, where the transmission resource includes a receive resource and a transmit resource.

In a specific embodiment, as shown in FIG. 6, in a case that each PSCCH/PSSCH occasion (the portion filled with squares) corresponds to a PSxCH occasion (the portion filled with slashes) (the following modes being used for other cases not excluded), a time interval between each PSCCH/PSSCH occasion and the associated PSxCH occasion is K, where the PSxCH occasion associated with the PSCCH/PSSCH occasion is the first PSxCH, after the PSCCH/PSSCH, that satisfies the interval; or the PSxCH associated with the PSCCH/PSSCH occasion is the first PSxCH, before the PSCCH/PSSCH, that satisfies the interval.

K includes at least processing time of UE, for example, at least one of PSxCH demodulation time/preparation time, PSCCH/PSCCH demodulation time/preparation time, receive/transmit switching time, resource reselection preparation time, PSFCH demodulation time/preparation time, and HARQ RTT time.

Figure 7:
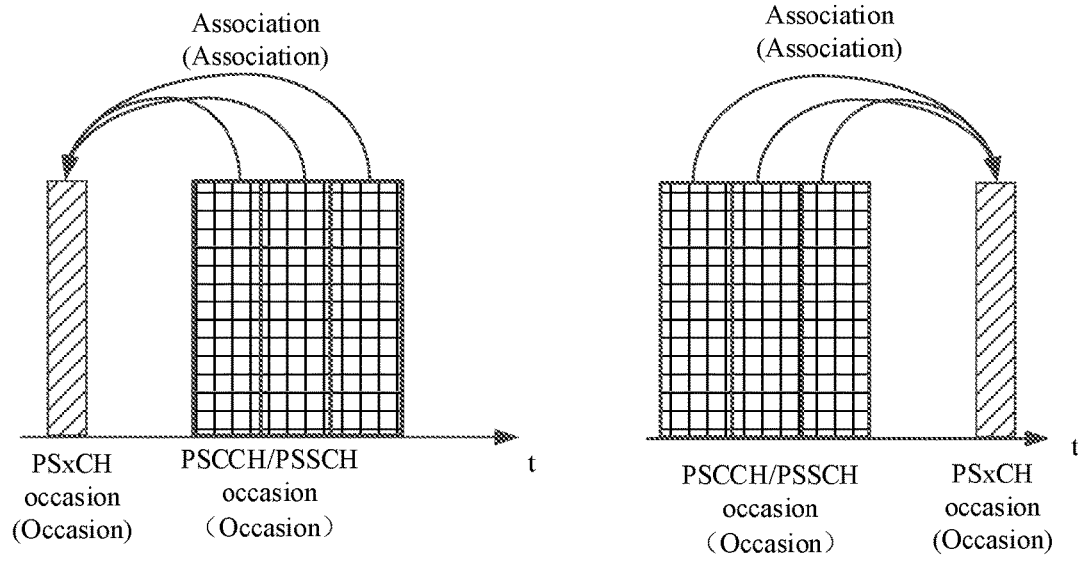
FIG. 7 is a schematic diagram of a plurality of PSCCH/PSSCH occasions corresponding to one PSxCH occasion.

In another specific embodiment, as shown in FIG. 7, in a case that each PSCCH/PSSCH occasion/every plurality of (continuous) PSCCH/PSSCH occasions correspond to one PSxCH occasion (the following modes being used for other cases not excluded), a minimum time interval between each PSCCH/PSSCH occasion and the associated PSxCH occasion is Kmin, where the PSxCH occasion associated with the PSCCH/PSSCH occasion is the first PSxCH, after the PSCCH/PSSCH, that satisfies the interval; or the PSxCH associated with the PSCCH/PSSCH occasion is the first PSxCH, before the PSCCH/PSSCH, that satisfies the interval.

Kmin includes at least processing time of UE, for example, at least one of PSxCH demodulation time/preparation time, PSCCH/PSCCH demodulation time/preparation time, receive/transmit switching time, resource reselection preparation time, PSFCH demodulation time/preparation time, and HARQ RTT time.

Figure 8:
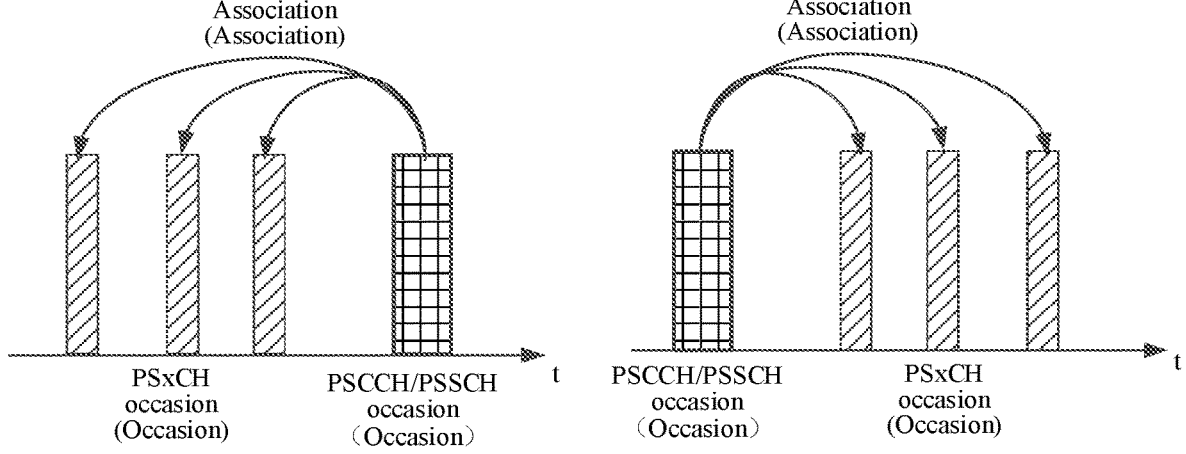
FIG. 8 and FIG. 9 are schematic diagrams of one PSCCH/PSSCH occasion corresponding to a plurality of PSxCH occasions.
Figure 9:
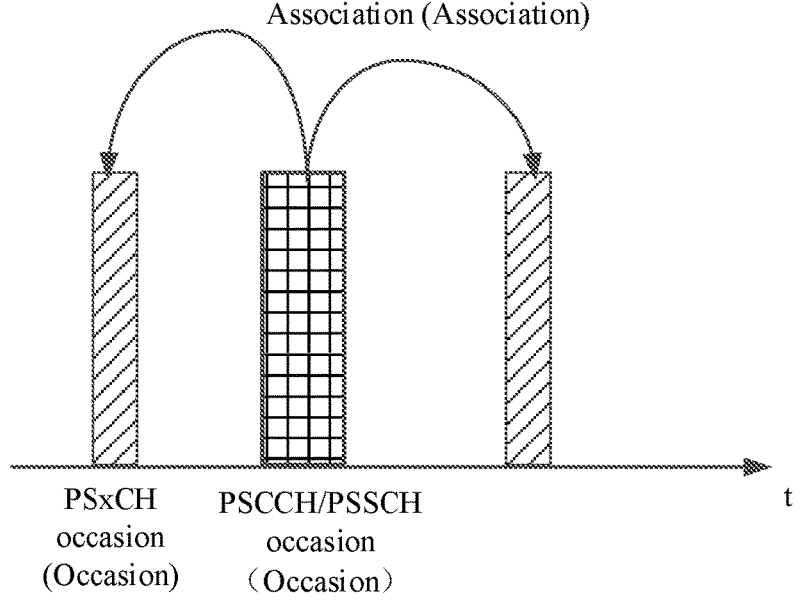

In another specific embodiment, as shown in FIGS. 8 and 9, in a case that each PSCCH/PSSCH occasion corresponds to a plurality of (continuous) PSxCH occasions (the following modes being used for other cases not excluded), time intervals between each PSCCH/PSSCH occasion and the associated PSxCH occasions are K1, K2, ..., and Kn, K1, K2, ..., and Kn corresponding to the plurality of PFXCH occasions, where the PSxCH occasions associated with the PSCCH/PSSCH occasion are the plurality of PSxCHs, after the PSCCH/PSSCH, that satisfy the intervals;

the PSxCHs associated with the PSCCH/PSSCH occasion are the plurality of PSxCHs, before the PSCCH/PSSCH, that satisfy the intervals; or the PSxCHs associated with the PSCCH/PSSCH occasion are the plurality of PSxCHs, before or after the PSCCH/PSSCH, that satisfy the intervals; where the positive/negative of K1, K2, ..., and Kn represents before/after respectively; or the negative/positive of K1, K2, ..., and Kn represents before/after respectively.

K1, K2, ..., and Kn include at least processing time of the UE, for example, at least one of PSxCH demodulation time/preparation time, PSCCH/PSCCH demodulation time/preparation time, receive/transmit switching time, resource reselection preparation time, PSFCH demodulation time/preparation time, and HARQ round-trip Time (RTT) time.

Figure 10:
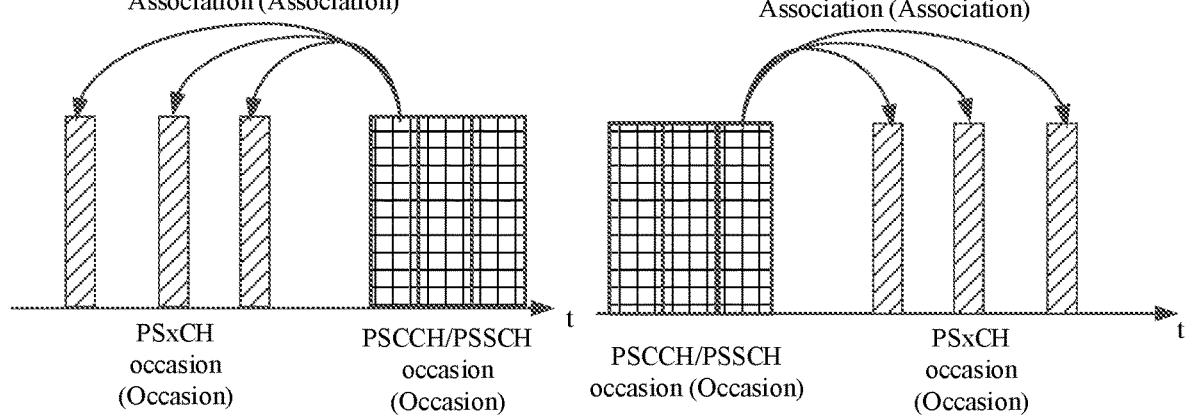
FIG. 10 is a schematic diagram of each PSCCH/PSSCH occasion corresponding to a plurality of continuous PSxCH occasions.

In another specific embodiment, as shown in FIG. 10, in a case that each PSCCH/PSSCH occasion corresponds to a plurality of (continuous) PSxCH occasions (the following modes being used for other cases not excluded), a minimum time interval between each PSCCH/PSSCH occasion and the associated PSxCH occasion is Kmin/the maximum time interval is Kmax, where the PSxCH occasions associated with the PSCCH/PSSCH occasion are the closest plurality of PSxCHs, after the PSCCH/PSSCH, that satisfy the intervals;

the PSxCHs associated with the PSCCH/PSSCH occasion are the closest plurality of PSxCHs, before the PSCCH/PSSCH, that satisfy the intervals; or the PSxCHs associated with the PSCCH/PSSCH occasion are the closest plurality of PSxCHs, before/after the PSCCH/PSSCH, that satisfy the intervals.

There may be negative Kmin_m and Kmax_m, and positive Kmin_p and Kmax_p, with positive/negative Kmin/Kmax representing before/after respectively, or negative/positive Kmin/Kmax representing before/after respectively.

Kmin/Kmax includes at least processing time of UE, for example, at least one of PSxCH demodulation time/preparation time, PSCCH/PSCCH demodulation time/preparation time, receive/transmit switching time, resource reselection preparation time, PSFCH demodulation time/preparation time, and HARQ RTT time.

Figure 11:
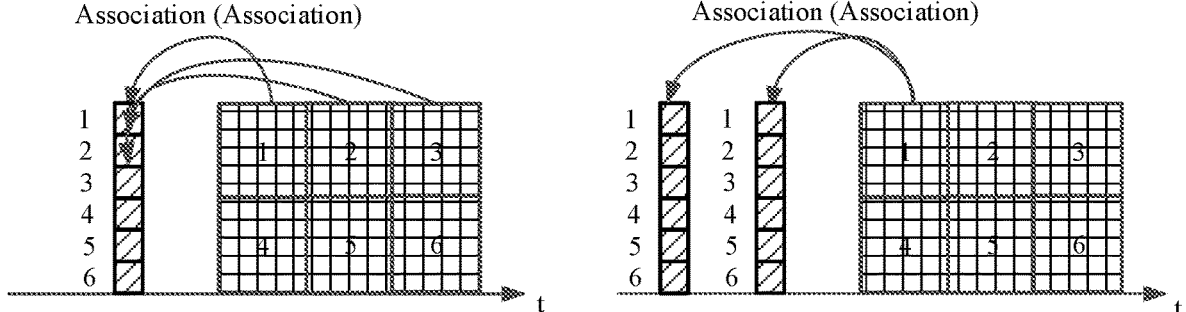
FIG. 11 is a schematic diagram of each or a plurality of PSCCH/PSSCH occasions corresponding to one or a plurality of PSxCH occasions.

In another specific embodiment, as shown in the left half of FIG. 11, if each PSCCH/PSSCH occasion/every plurality of PSCCH/PSSCH occasions correspond to one PSxCH occasion, the following steps are performed.

Step 1. Number the resources of the PSCCH/PSSCH occasion(s) corresponding to the PSxCH occasion, for example, number them from smallest to largest in time domain or vice versa, number them from smallest to largest in frequency domain or vice versa, or number them first in time domain and then in frequency domain or vice versa.

Step 2: Number the PSxCH resources on the PSxCH occasion, for example, number them from smallest to largest in time domain or vice versa (if any time domain), number them from smallest to largest in frequency domain or vice versa, number them from smallest to largest in the code domain (CS index from smallest to largest) or vice versa, or number them in an order of a combination of at least two of time domain, frequency domain, and code domain.

Step 3: Each numbered PSCCH/PSSCH resource corresponds to one/more types of numbered PSxCH resources. For example, assuming that the PSCCH/PSSCH resources are numbered 1 to M (0 to M−1) and the PSxCH resources are numbered 1 to N (0 to N−1), the first PSCCH/PSSCH resource corresponds to the first to n1-th PSxCH resources, the second PSCCH/PSSCH resource corresponds to the (n1+1)-th to the (2*n1)-th PSxCH resources, and so on, where n1 may be N/M (rounded/rounded up/rounded down).

In another specific embodiment, as shown in the right half of FIG. 11, in a case that each PSCCH/PSSCH occasion/ every plurality of PSCCH/PSSCH occasions correspond to a plurality of PSxCH occasions, the following steps are performed.

Step 1. Number the resources of the PSCCH/PSSCH occasion(s) corresponding to the PSxCH occasions, for example, number them from smallest to largest in time domain or vice versa, number them from smallest to largest in frequency domain or vice versa, or number them first in the time domain and then in frequency domain or vice versa.

Step 2: Individually number the PSxCH resources corresponding to each PSxCH occasion in the plurality of PSxCH occasions (the corresponding resources may be in the corresponding PSxCH subsets), for example, number them from smallest to largest in time domain or vice versa (if any time domain), number them from smallest to largest in frequency domain or vice versa, number them from smallest to largest in code domain (CS index from smallest to largest) or vice versa, or number them in an order of a combination of at least two of time domain, frequency domain, and code domain.

Step 3: Each numbered PSCCH/PSSCH resource corresponds to one/more types of numbered PSxCH resources. For example, assuming that the PSCCH/PSSCH resources are numbered 1 to M (0 to M−1) and the corresponding PSxCH resources of one PSxCH occasion are numbered 1 to N (0 to N−1), the first PSCCH/PSSCH resource corresponds to the first to n1-th PSxCH resources, the second PSCCH/PSSCH resource corresponds to the (n1+1)-th to the (2*n1)-th, and so on, where n1 may be N/M (rounded/rounded up/rounded down).

Figure 12:
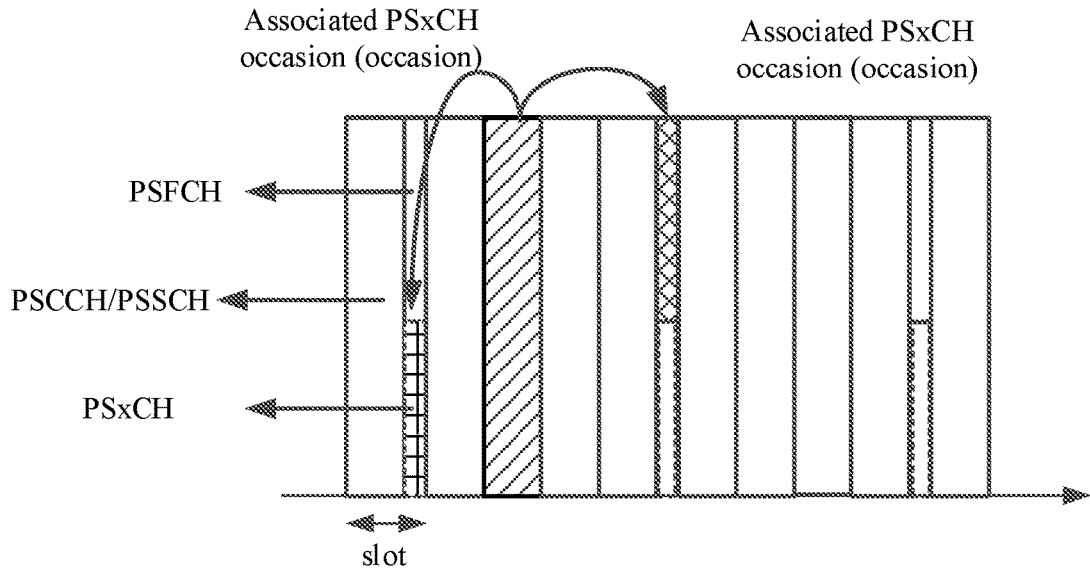
FIG. 12 is a schematic diagram indicating that a PSxCH occasion associated with a PSCCH/PSSCH resource is a PSFCH occasion that precedes a PSFCH occasion associated with the PSCCH/PSSCH resource.

In another specific embodiment, as shown in FIG. 12, PSxCH and PSFCH occasions are FDMed. The PSxCH occasion associated with the PSCCH/PSSCH resource is a PSFCH occasion that precedes the PSFCH occasion associated with the PSCCH/PSSCH resource.

In the foregoing embodiments, "/" represents "and/or" or represents "or".

It should be noted that the conflict indication method according to the embodiments of this application may be performed by a conflict indication apparatus or a module for performing or loading the conflict indication method in the conflict indication apparatus. In the embodiments of this application, the conflict indication apparatus performing or loading the conflict indication method is used as an example for describing the conflict indication method according to the embodiments of this application.

Figure 13:
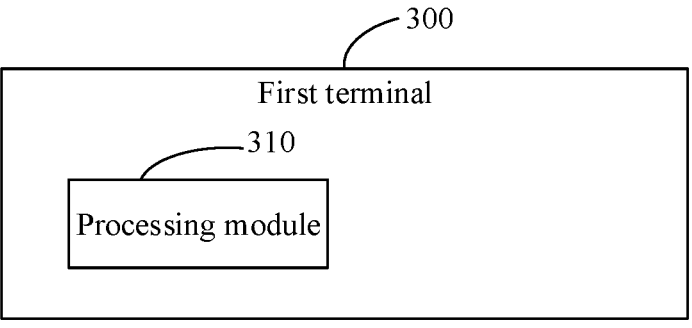
FIG. 13 is a schematic structural diagram of a conflict indication apparatus for a first terminal according to an embodiment of this application.

An embodiment of this application provides a conflict indication apparatus applied to a first terminal 300. As shown in FIG. 13, the apparatus includes:

a processing module 310 configured to: in a case that a resource or transmission conflict is determined, indicate a resource or transmission conflict to a second terminal, including any one of the following:

transmitting conflict indication signaling to the second terminal;

performing conflict indication through a physical sidelink channel PSxCH; and performing conflict indication through a physical sidelink feedback channel PSFCH resource corresponding to a resource under conflict.

In this embodiment of this application, after determining a resource or transmission conflict, the first terminal can indicate the resource or transmission conflict to the second terminal in a variety of ways such that the second terminal does not use a resource under conflict, thereby avoiding a transmission resource or transmission conflict.

In some embodiments, the conflict indication signaling uses any one of the following:

sidelink control information SCI;

media access control MAC control element CE;

channel state information;

sidelink feedback control information SFCI; and sidelink reference signal, for example demodulation reference signal (DMRS), channel state information reference signal (CSI-RS), and phase tracking reference signal (PT-RS).

A transmission time of conflict indication signaling needs to be regulated.

In some embodiments, a first time at which the conflict indication signaling is transmitted satisfies any one of the following:

being after a second time and having an interval to the second time less than a first threshold or not greater than the first threshold, where the second time is a time at which the resource or transmission conflict is detected, that is, the terminal needs to transmit the conflict indication signaling within a restricted time after detection of the conflict;

being before the resource under conflict and having an interval to a time at which the resource under conflict is present greater than a second threshold or not less than the second threshold; and being before a third time and having an interval to the third time greater than a third threshold or not less than the third threshold, where the third time is a time at which reserved indication signaling or indication signaling for the resource under conflict is transmitted.

Determining factors of the second threshold include at least one of demodulation duration of signaling, processing duration of resource reselection, and transmit-receive transition duration.

Determining factors of the third threshold include at least one of demodulation duration of signaling, processing duration of resource reselection, and transmit-receive transition duration.

In some embodiments, a PSxCH resource includes at least one of a time domain resource, a frequency domain resource, and a code domain resource.

The time domain resource includes L time domain basic units predefined by a protocol, configured by a control node, or pre-configured, L being a positive integer; where the time domain basic units include symbols, slots, and sub-slots; and the L time domain basic units may be L continuous time domain basic units. For example, the time domain resource includes 1 symbol, or 2 contiguous symbols.

The frequency domain resource includes F frequency domain basic units predefined by a protocol, configured by a control node, or pre-configured, F being a positive integer; where the frequency domain basic unit may be a physical resource block (PRB), a sub-carrier sub-carrier, or a sub-channel sub-channel; and the F frequency domain basic units may be F contiguous frequency domain basic units. For example, the frequency domain basic unit may be 1 physical resource block.

The code domain resource includes C code sequences predefined by a protocol, configured by a control node, or pre-configured, or is a code sequence generated according to a sequence generation rule predefined by a protocol, configured by a control node, or pre-configured, C being a positive integer. For example, a ZC sequence is used, and a set of code sequences is generated by a combination of CS, u, and v. A distinguishing parameter of the C code sequences may be one or more of CS, u, and v. Typically, different code sequences are distinguished by CS, and the C code sequences may also be fixed grouping sequences.

In some embodiments, state information of the PSxCH is expressed using any one of the following:

at least one of a time domain basic unit, a frequency domain basic unit, and a code sequence; and a coded bit, where if a PSxCH resource does not include a code domain resource, the PSxCH state information may be expressed using the coded bit.

In some embodiments, the PSxCH channel includes X PSxCH occasions occasion in time domain, the PSxCH occasion includes Y PSxCH frequency domain resources, and the PSxCH channel includes Z code domain resources, X, Y, and Z being positive integers.

A typical value of X is 1. A position of a PSxCH occasion on a slot may be specified by a protocol, configured by a control node, or pre-configured, and a typical position is a time domain position of the PSFCH channel. A period and a starting position in a system frame number (SFN) and/or direct frame number (DFN) of a PSxCH occasion may be configured by a protocol, configured by a control node, or pre-configured.

A PSxCH occasion includes Y PSxCH frequency domain resources, where Y≥1. For example, PRBs occupied by a PSxCH occasion may be indicated by a bitmap, or PRBs occupied by a PSxCH occasion may be indicated in a mode of tart position+length. A typical indication mode is the same as the indication mode of a PSFCH channel.

A PSxCH channel includes Z code domain resources, where Z≥1. For example, a total number of code sequences can be indicated, and thus the number of code domain resources can be deduced.

Optionally, a PSxCH occasion may be divided into a plurality of PSxCH resource subsets. A PSCCH/PSSCH resource may be associated with a plurality of PSxCH occasions, the associated PSxCH occasions at different positions need to correspond to different resource subsets to prevent a plurality of PSCCHs/PSSCHs from being associated with a same PSxCH resource.

In some embodiments, A time domain basic units before the PSxCH occasion are used to transmit an AGC signal, for example, 1 symbol before the PSxCH occasion is used to transmit the AGC signal. In this way, the terminal transmits the ACG signal before transmitting the PSxCH resource, and the A time domain basic units are adjacent to the PSxCH occasion.

The frequency domain width of the signal is equal to the PSxCH frequency domain resource to be transmitted, and/or the power or power spectral density (PSD) of the signal transmission is equal to the power or PSD of the PSxCH resource transmission, and/or the signal may replicate a portion of the PSxCH, for example, the signal of the 1st or nth symbol of the PSxCH is replicated to the ACG symbol transmission.

In some embodiments, the PSxCH is multiplexed with a PSCCH and/or a PSSCH using at least one of the following:

time division multiplexing TDM, where the symbols occupied by the PSCCH/PSSCH do not include the symbols occupied by the PSxCH/AGC; or if the PSCCH/PSSCH transmission overlaps with the PSxCH channel/PSxCH transmission/AGC, the puncturing/rate matching operation is performed on the PSCCH/PSSCH; and frequency division multiplexing FDM.

In some embodiments, the PSxCH is multiplexed with a PSFCH using at least one of the following:

FDM, where the PSxCH occasion overlaps the PSFCH occasion, the time domain (pre)configuration of the PSxCH channel is multiplexed with the time domain (pre)configuration of the PSFCH channel, and/or, the code domain (pre)configuration is multiplexed with the time domain (pre)configuration of the PSFCH channel;

space division multiplexing SDM, where the time-frequency domains of PSxCH and PSFCH overlap and the time-frequency domain (pre)configuration of the PSxCH channel is multiplexed with the time-frequency domain (pre)configuration of the PSFCH channel; and

TDM.

In some embodiments, as shown in FIG. 3, a PSxCH resource is associated (associated) with a physical sidelink control channel PSCCH resource and/or a physical sidelink shared channel PSSCH resource, where Conflict indication is a conflict indication and Reservation is reservation information.

In some embodiments, as shown in the left half of FIG. 3, conflict information carried on the PSxCH indicates that a PSCCH and/or PSSCH resource associated with a PSxCH resource encounters a conflict; or conflict information carried on the PSxCH indicates that a PSFCH corresponding to a PSCCH and/or PSSCH resource associated with a PSxCH resource encounters a conflict.

A protocol may only support indicating one of PSSCH and PSFCH conflicts, or a protocol supports indicating PSSCH and PSFCH conflicts. For example, different information state values of the PSxCH indicate a PSCCH conflict and a PSFCH conflict respectively; or a same information state indicates a PSCCH conflict or a PSFCH conflict.

In some embodiments, as shown in the right half of FIG. 3, conflict information carried on the PSxCH indicates that a PSCCH and/or PSSCH resource reserved for a PSCCH and/or PSSCH resource associated with a PSxCH resource encounters a conflict; or conflict information carried on the PSxCH indicates that a PSFCH corresponding to a PSCCH and/or PSSCH resource reserved for a PSCCH and/or PSSCH resource associated with a PSxCH resource encounters a conflict.

A protocol may only support indicating that the PSCCH/PSSCH resource, reserved using reservation information of one or some preset categories, encounters/causes a conflict. For example, the conflict information indicates that a PSCCH and/or PSSCH resource reserved using a preset category of reservation information encounters a conflict, for example, periodical reservation, aperiodic reservation, a first aperiodically reserved PSCCH/PSSCH, a second aperiodically reserved PSCCH/PSSCH, a first in the next period of periodically reserved PSCCH/PSSCH, and a second in the next period of periodically reserved PSCCH/PSSCH. This can indicate the occurrence of a conflict earlier so that UE can take action earlier, for example, more time can be left for the UE for resource selection.

In addition, the state information in the PSxCH additionally carries HARQ-ACK feedback information and the PSxCH is in New PSFCH format.

In some embodiments, the PSxCH resource has a time-domain association with the PSCCH and/or PSSCH resource, including any one of the following:

one PSCCH or PSSCH occasion being associated with one PSxCH occasion, such that the design of the PSFCH can be reused to the maximum extent;

a plurality of PSCCH and/or PSSCH occasions being associated with one PSxCH occasion, such that the design of the PSFCH can be reused to the maximum extent;

one PSCCH or PSSCH occasion being associated with a plurality of PSxCH occasions; and a plurality of PSCCH and/or PSSCH occasions being associated with a plurality of PSxCH occasions.

The plurality of PSCCH and/or PSSCH occasions may be a plurality of PSCCH and/or PSSCH occasions of consecutive occurrence.

In some embodiments, in the case that one PSCCH or PSSCH occasion is associated with a plurality of PSxCH occasions; or that a plurality of PSCCH and/or PSSCH occasions are associated with a plurality of PSxCH occasions, for the plurality of PSxCH occasions, one PSxCH resource subset in the PSxCH occasions corresponds to the one PSCCH or PSSCH occasion or corresponds to the plurality of PSCCH and/or PSSCH occasions.

In some embodiments, in the case that one PSCCH or PSSCH occasion is associated with a plurality of PSxCH occasions; or that a plurality of PSCCH and/or PSSCH occasions are associated with a plurality of PSxCH occasions, content indicated by indication information carried by each PSxCH occasion in the plurality of associated PSxCH occasions is independently specified.

In some embodiments, an associated PSxCH occasion before a PSCCH and/or PSSCH at least indicates whether the PSCCH and/or PSSCH encounters a conflict, and an associated PSxCH occasion after a PSCCH and/or PSSCH at least indicates whether a PSCCH and/or PSSCH reserved for the PSCCH and/or PSSCH encounters a conflict.

In some embodiments, according to content carried by PSxCH information, in a case that multiple types of conflict information is present, each type of conflict information of a PSCCH or PSSCH is individually mapped to one PSxCH occasion.

Compared with the "one or more PSCCH or PSSCH occasions are associated with one PSxCH occasion" scenario, the "one or more PSCCH or PSSCH occasions are associated with a plurality of PSxCH occasions" scenario has more flexibility as to a position for transmitting conflict indication information and can indicate a conflict in a timely manner. For example, the resource or transmission conflicts detected at positions #1, #2, and #3 in FIG. 4 can be indicated at any time.

In some embodiments, a time interval, minimum time interval, or maximum time interval between a PSCCH and/or PSSCH occasion and an associated PSxCH occasion is K, K being a duration predefined by a protocol, configured by a control node, or pre-configured.

In some embodiments, a PSCCH and/or PSSCH occasion precedes an associated PSxCH occasion; or a PSCCH and/or PSSCH occasion follows an associated PSxCH occasion.

The above content may be predefined by a protocol, configured by a control node, or pre-configured. Optionally, if each PSCCH/PSSCH is associated with a plurality of PSxCH occasions, all of the associated PSxCH occasions precede the PSCCH/PSSCH, follow the PSCCH/PSSCH, partially precede the PSCCH/PSSCH, or partially follow the PSCCH/PSSCH.

In some embodiments, a resource on a PSCCH and/or PSSCH occasion corresponding to a PSxCH occasion is numbered; and a PSxCH resource on a PSxCH occasion is numbered; where each numbered PSCCH or PSSCH resource corresponds to one or more numbered PSxCH resources.

In some embodiments, a PSxCH occasion associated with a PSCCH and/or PSSCH resource is associated with a PSFCH occasion associated with the PSCCH and/or PSSCH resource.

In some embodiments, the PSxCH occasion associated with the PSCCH and/or PSSCH resource is within a same slot slot or a same symbol symbol in a same slot as the PSFCH occasion associated with the PSCCH and/or PSSCH resource.

In some embodiments, the PSxCH occasion associated with the PSCCH and/or PSSCH resource precedes the PSFCH occasion associated with the PSCCH and/or PSSCH resource; or the PSxCH occasion associated with the PSCCH and/or PSSCH resource follows the PSFCH occasion associated with the PSCCH and/or PSSCH resource.

The above content may be predefined by a protocol, configured by a control node, or pre-configured. For example, the PSxCH occasion associated with the PSCCH and/or PSSCH resource is the P-th PSFCH occasion that follows the PSFCH occasion associated with the PSCCH and/or PSSCH resource.

In some embodiments, the PSxCH occasion associated with the PSCCH and/or PSSCH resource and the PSFCH occasion associated with the PSCCH and/or PSSCH resource are TDMed.

In some embodiments, state information of the PSxCH carries HARQ-ACK feedback information.

In some embodiments, the processing module is further configured to determine a PSxCH transmit resource, where the determining a PSxCH transmit resource includes:

determining a target PSCCH and/or PSSCH resource;

determining a target PSxCH resource, the target PSxCH resource being associated with the target PSCCH and/or PSSCH resource; and selecting at least one PSxCH from the at least one target PSxCH resource for transmission.

In some embodiments, the target PSCCH and/or PSSCH resource is a PSCCH and/or PSSCH resource that encounters a conflict; or the target PSCCH and/or PSSCH resource is a PSCCH and/or PSSCH resource that causes a PSFCH conflict; and the target PSCCH and/or PSSCH resource is a third-party PSCCH and/or PSSCH resource, and the PSCCH and/or PSSCH resource that encounters a conflict is reserved for the third-party PSCCH and/or PSSCH resource; or the target PSCCH and/or PSSCH resource is a third-party PSCCH and/or PSSCH resource, and the PSCCH and/or PSSCH resource that causes a PSFCH conflict is reserved for the third-party PSCCH and/or PSSCH resource.

In some embodiments, in a case that the target PSCCH and/or PSSCH resource includes a plurality of resources, the target PSxCH resource is:

all PSxCH resources corresponding to the plurality of resources; or a PSxCH resource corresponding to one of the plurality of resources, the one resource being a resource with a largest time domain number, a smallest time domain number, a largest frequency domain number, or a smallest frequency domain number in the plurality of resources.

In some embodiments, in a case that the target PSCCH and/or PSSCH resource corresponds to a plurality of PSxCH occasions, the target PSxCH resource in at least one PSxCH occasion is selected.

In some embodiments, one PSxCH occasion is selected based on content indicated in the PSxCH occasion, for example, a resource in the selected PSxCH occasion may indicate the conflict; or at least one PSxCH occasion is selected based on an occurrence time of the PSxCH occasion, for example, one or more PSxCH occasions closest to the current detecting time are selected, or a PSxCH occasion closest to the target PSCCH/PSSCH resource is selected, which may be limited to be located before or after the target PSCCH/PSSCH resource.

In some embodiments, the selecting at least one PSxCH from at least one target PSxCH resource for transmission includes any one of the following:

selecting a PSxCH transmission resource based on a terminal identifier, for example, in a case that the number of target PSxCH resources is Q (sequentially numbered), UE uses the q-th PSxCH resource for transmission, q being UE ID mod Q, where the UE ID may be a UE ID of a target counterpart of 'trigger or notification' signaling and/or a local UE ID for transmitting the PSxCH; and selecting a PSxCH transmission resource based on a zone identifier, where the zone ID may be a zone ID of a target counterpart of 'trigger or notification' and/or a local zone ID for transmitting the PSxCH.

In some embodiments, in a case that a PSxCH transmit/receive conflict occurs, the processing module performs any one of the following:

abandoning reception of the PSxCH or transmission of the PSxCH according to a rule predefined by a protocol;

abandoning reception of the PSxCH or transmission of the PSxCH according to a pre-configured rule;

abandoning reception of the PSxCH or transmission of the PSxCH according to a rule configured by a control node; and abandoning reception of the PSxCH or transmission of the PSxCH based on a priority of a PSCCH and/or PSSCH resource associated with the PSxCH, for example, the one with a lower priority may be abandoned.

In some embodiments, if a plurality of transmitted PSxCHs are under conflict, the processing module performs any one of the following:

in case of power limitation, transmission of one or more PSxCHs is abandoned based on priorities of PSCCH and/or PSSCH resources associated with the PSxCHs, for example, the one with a lower priority may be abandoned; and in case of no power limitation, the plurality of PSxCHs are transmitted with equal power, or transmit power of the plurality of PSxCHs is determined based on priorities of PSCCH and/or PSSCH resources associated with the PSxCHs, for example, the transmit power of the one with a lower priority is lower than the transmit power of the one with a higher priority.

In some embodiments, in a case that transmission of the PSxCH conflicts with reception of a PSFCH, the processing module performs any one of the following:

abandoning transmission of the PSxCH or reception of the PSFCH according to a rule predefined in a protocol;

abandoning transmission of the PSxCH or reception of the PSFCH according to a pre-configured rule;

abandoning transmission of the PSxCH or reception of the PSFCH according to a rule configured by a control node; and transmitting the PSxCH or receiving the PSFCH based on a priority of a PSCCH and/or PSSCH resource associated with the PSxCH, for example, the one with a lower priority may be abandoned.

The above rule may be that the priority of the PSCCH and/or PSSCH resource associated with the PSxCH is above a threshold for PSxCH transmission, otherwise PSxCH transmission is abandoned.

In some embodiments, in a case that reception of the PSxCH conflicts with transmission of a PSFCH, the processing module performs any one of the following:

abandoning reception of the PSxCH or transmission of the PSFCH according to a rule predefined by a protocol;

abandoning reception of the PSxCH or transmission of the PSFCH according to a pre-configured rule;

abandoning reception of the PSxCH or transmission of the PSFCH according to a rule configured by a control node; and receiving the PSxCH or transmitting the PSFCH based on a priority of a PSCCH and/or PSSCH resource associated with the PSxCH, for example, the one with a lower priority may be abandoned.

The above rule may be that the priority of the PSCCH and/or PSSCH resource associated with the PSxCH is above a threshold for PSxCH reception, otherwise PSxCH reception is abandoned.

In some embodiments, in a case that transmission of the PSxCH conflicts with transmission of a PSFCH, in case of power limitation, the processing module performs at least one of the following:

discarding the PSxCH or PSFCH according to a rule predefined by a protocol, configured by a control node, or pre-configured;

transmitting the PSxCH or PSFCH based on a priority of a PSCCH and/or PSSCH resource associated with the PSxCH, for example, the one with a higher priority is transmitted in priority; and in case of no power limitation, transmitting a plurality of PSxCHs and PSFCHs with equal power, or determining transmit power of the PSxCHs based on priorities of PSCCH and/or PSSCH resources associated with the PSxCHs, for example, the transmit power of the one with a lower priority is lower than the transmit power of the one with a higher priority.

The above rule may be that the priority of the PSCCH and/or PSSCH resource associated with the PSxCH is above a threshold for PSxCH transmission, otherwise PSxCH transmission is abandoned.

In some embodiments, the performing conflict indication through a physical sidelink feedback channel PSFCH resource corresponding to a resource under conflict:

reporting negative acknowledgement NACK on the PSFCH corresponding to the resource under conflict.

The conflict indication apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The conflict indication apparatus in this embodiment of this application may be an apparatus having an operating system. The operating system may be an Android operating system, iOS operating system, or other possible operating system. This is not specifically limited in the embodiments of this application.

It should be noted that the conflict indication method according to the embodiments of this application may be performed by a conflict indication apparatus or by a module for performing or loading the conflict indication method in the conflict indication apparatus. In the embodiments of this application, the conflict indication apparatus performing or loading the conflict indication method is used as an example for describing the conflict indication method according to the embodiments of this application.

Figure 14:
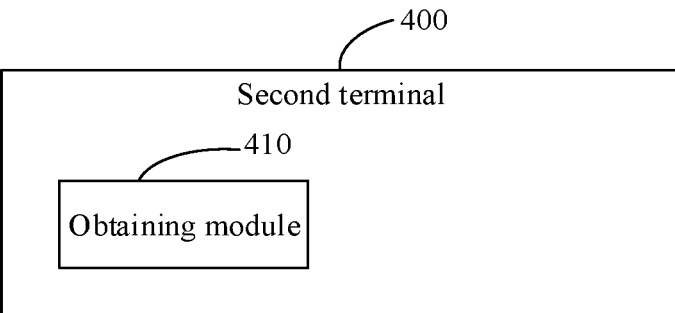
FIG. 14 is a schematic structural diagram of a conflict indication apparatus for a second terminal according to an embodiment of this application.

An embodiment of this application provides a conflict indication apparatus applied to a second terminal 400. As shown in FIG. 14, the apparatus includes:

an obtaining module 410 configured to obtain, by performing any one of the following, conflict indication information indicated by a first terminal:

receiving conflict indication signaling from the first terminal;

monitoring a physical sidelink channel PSxCH corresponding to a physical sidelink control channel PSCCH transmission resource and/or a physical sidelink shared channel PSSCH transmission resource to obtain conflict indication information; and monitoring a physical sidelink feedback channel PSFCH resource to obtain information of a resource under conflict.

UE performs PSCCH/PSSCH transmission, and the obtaining module 410 monitors at least a PSxCH resource corresponding to its PSCCH/PSSCH transmission resource to monitor conflict indication information, where the transmission resource includes a receive resource and a transmit resource.

The conflict indication apparatus in this embodiment of this application may be an apparatus having an operating system. The operating system may be an Android operating system, iOS operating system, or other possible operating system. This is not specifically limited in the embodiments of this application.

Optionally, an embodiment of this application further provides an electronic device including a processor, a memory, and a program or instructions stored in the memory and capable of running on the processor. When the program or instructions are executed by the processor, the processes of the foregoing embodiments of the conflict indication method are implemented, with the same technical effects achieved. To avoid repetition, details are not described herein again.

It should be noted that the electronic device in this embodiment of this application includes the aforementioned mobile electronic device and non-mobile electronic device.

Figure 15:
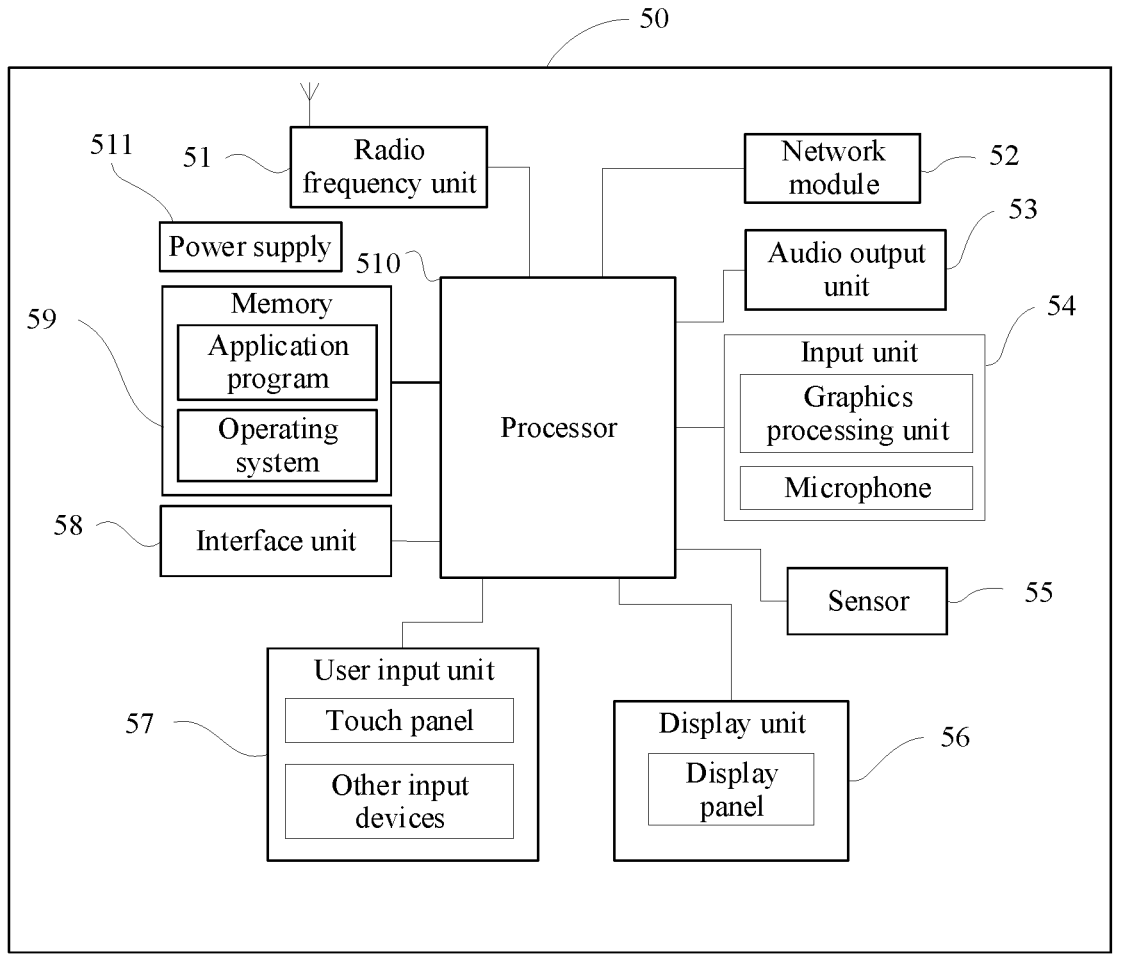
FIG. 15 is a schematic compositional diagram of a terminal according to an embodiment of this application.

The electronic device in this embodiment may be a terminal. FIG. 15 is a schematic diagram of a hardware structure of a terminal according to an embodiment of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Persons skilled in the art may understand that the structure of the terminal shown in FIG. 15 does not constitute a limitation on the terminal. The terminal may include more or fewer components than shown in the figure, or combine some of the components, or have different arrangements of the components. In this embodiment of this application, the terminal includes but is not limited to a mobile phone, a tablet computer, a laptop computer, a personal digital assistant, an in-vehicle terminal, a wearable device, and a pedometer.

It should be understood that in this embodiment of this application, the radio frequency unit 51 may be configured to receive and transmit information, or to receive and transmit a signal in a call process, and specifically, after receiving downlink data from a base station, transmit the downlink data to the processor 510 for processing; and transmit uplink data to the base station. Generally, the radio frequency unit 51 includes but is not limited to an antenna, at least one amplifier, a transceiver, a coupler, a low noise amplifier, and a duplexer. In addition, the radio frequency unit 51 may further communicate with a network and other devices via a wireless communications system.

The memory 59 may be configured to store a software program and various data. The memory 59 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 59 may include a high-speed random access memory, or may further include a non-volatile memory, for example, at least one magnetic disk storage device, a flash memory device, or another volatile solid-state storage device.

The processor 510 is a control center of the terminal, and is connected to the components of the terminal via various interfaces and lines. By running or executing software programs and/or modules stored in the memory 59 and calling data stored in the memory 59, the processor 510 executes various functions of the terminal and processes data so as to perform overall monitoring on the terminal. The processor 510 may include one or at least two processing units. Preferably, the processor 510 may integrate an application processor and a modem processor. The application processor mainly processes an operating system, a user interface, application programs, and the like. The modem processor mainly processes wireless communication. It can be understood that the modem processor may alternatively be not integrated in the processor 510.

The terminal 50 may further include a power supply 511 (for example, a battery) that supplies power to the components. Preferably, the power supply 511 may be logically connected to the processor 510 by using a power management system, so as to implement functions such as charging management, discharging management, and power consumption management by using the power management system.

In addition, the terminal 50 includes some functional modules that are not shown. Details are not described herein.

The processor 510 is configured to: in a case that a resource or transmission conflict is determined, indicate a resource or transmission conflict to a second terminal, including any one of the following:

transmitting conflict indication signaling to the second terminal;

performing conflict indication through a physical sidelink channel PSxCH; and performing conflict indication through a physical sidelink feedback channel PSFCH resource corresponding to a resource under conflict.

In this embodiment of this application, after determining a resource or transmission conflict, the first terminal can indicate the resource or transmission conflict to the second terminal in a variety of ways such that the second terminal does not use a resource under conflict, thereby avoiding a transmission resource or transmission conflict.

In some embodiments, the conflict indication signaling uses any one of the following:

sidelink control information SCI;

media access control MAC control element CE;

channel state information;

sidelink feedback control information SFCI; and sidelink reference signal, for example, DMRS (Demodulation reference signal), channel state information reference signal (CSI-RS), and phase tracking reference signal (PT-RS).

A transmission time of conflict indication signaling needs to be regulated.

In some embodiments, a first time at which the conflict indication signaling is transmitted satisfies any one of the following:

being after a second time and having an interval to the second time less than a first threshold or not greater than the first threshold, where the second time is a time at which the resource or transmission conflict is detected, that is, the terminal needs to transmit the conflict indication signaling within a restricted time after detection of the conflict;

being before the resource under conflict and having an interval to a time at which the resource under conflict is present greater than a second threshold or not less than the second threshold; and being before a third time and having an interval to the third time greater than a third threshold or not less than the third threshold, where the third time is a time at which reserved indication signaling or indication signaling for the resource under conflict is transmitted.

Determining factors of the second threshold include at least one of demodulation duration of signaling, processing duration of resource reselection, and transmit-receive transition duration.

Determining factors of the third threshold include at least one of demodulation duration of signaling, processing duration of resource reselection, and transmit-receive transition duration.

In some embodiments, a PSxCH resource includes at least one of a time domain resource, a frequency domain resource, and a code domain resource.

The time domain resource includes L time domain basic units predefined by a protocol, configured by a control node, or pre-configured, L being a positive integer; where the time domain basic units include symbols, slots, and sub-slots; and the L time domain basic units may be L continuous time domain basic units. For example, the time domain resource includes 1 symbol, or 2 contiguous symbols.

The frequency domain resource includes F frequency domain basic units predefined by a protocol, configured by a control node, or pre-configured, F being a positive integer; where the frequency domain basic unit may be a physical resource block (PRB), a sub-carrier sub-carrier, or a sub-channel sub-channel; and the F frequency domain basic units may be F contiguous frequency domain basic units. For example, the frequency domain basic unit may be 1 physical resource block.

The code domain resource includes C code sequences predefined by a protocol, configured by a control node, or pre-configured, or is a code sequence generated according to a sequence generation rule predefined by a protocol, configured by a control node, or pre-configured, C being a positive integer. For example, a ZC sequence is used, and a set of code sequences is generated by a combination of CS, u, and v. A distinguishing parameter of the C code sequences may be one or more of CS, u, and v. Typically, different code sequences are distinguished by CS, and the C code sequences may also be fixed grouping sequences.

In some embodiments, state information of the PSxCH is expressed using any one of the following:

at least one of a time domain basic unit, a frequency domain basic unit, and a code sequence; and a coded bit, where if a PSxCH resource does not include a code domain resource, the PSxCH state information may be expressed using the coded bit.

In some embodiments, the PSxCH channel includes X PSxCH occasions occasion in time domain, the PSxCH occasion includes Y PSxCH frequency domain resources, and the PSxCH channel includes Z code domain resources, X, Y, and Z being positive integers.

A typical value of X is 1. A position of a PSxCH occasion on a slot may be specified by a protocol, configured by a control node, or pre-configured, and a typical position is a time domain position of the PSFCH channel. A period and a starting position in a system frame number (SFN) and/or direct frame number (DFN) of a PSxCH occasion may be configured by a protocol, configured by a control node, or pre-configured.

A PSxCH occasion includes Y PSxCH frequency domain resources, where Y≥1. For example, PRBs occupied by a PSxCH occasion may be indicated by a bitmap, or PRBs occupied by a PSxCH occasion may be indicated in a mode of tart position+length. A typical indication mode is the same as the indication mode of a PSFCH channel.

A PSxCH channel includes Z code domain resources, where Z≥1. For example, a total number of code sequences can be indicated, and thus the number of code domain resources can be deduced.

Optionally, a PSxCH occasion may be divided into a plurality of PSxCH resource subsets. A PSCCH/PSSCH resource may be associated with a plurality of PSxCH occasions, the associated PSxCH occasions at different positions need to correspond to different resource subsets to prevent a plurality of PSCCHs/PSSCHs from being associated with a same PSxCH resource.

In some embodiments, A time domain basic units before the PSxCH occasion are used to transmit an AGC signal, for example, 1 symbol before the PSxCH occasion is used to transmit the AGC signal. In this way, the terminal transmits the ACG signal before transmitting the PSxCH resource, and the A time domain basic units are adjacent to the PSxCH occasion.

The frequency domain width of the signal is equal to the PSxCH frequency domain resource to be transmitted, and/or the power or power spectral density (PSD) of the signal transmission is equal to the power or PSD of the PSxCH resource transmission, and/or the signal may replicate a portion of the PSxCH, for example, the signal of the 1st or nth symbol of the PSxCH is replicated to the ACG symbol transmission.

In some embodiments, the PSxCH is multiplexed with a PSCCH and/or a PSSCH using at least one of the following:

time division multiplexing TDM, where the symbols occupied by the PSCCH/PSSCH do not include the symbols occupied by the PSxCH/AGC; or if the PSCCH/PSSCH transmission overlaps with the PSxCH channel/PSxCH transmission/AGC, the puncturing/rate matching operation is performed on the PSCCH/PSSCH; and frequency division multiplexing FDM.

In some embodiments, the PSxCH is multiplexed with a PSFCH using at least one of the following:

FDM, where the PSxCH occasion overlaps the PSFCH occasion, the time domain (pre)configuration of the PSxCH channel is multiplexed with the time domain (pre)configuration of the PSFCH channel, and/or, the code domain (pre)configuration is multiplexed with the time domain (pre)configuration of the PSFCH channel;

space division multiplexing SDM, where the time-frequency domains of PSxCH and PSFCH overlap and the time-frequency domain (pre)configuration of the PSxCH channel is multiplexed with the time-frequency domain (pre)configuration of the PSFCH channel; and TDM.

In some embodiments, as shown in FIG. 3, a PSxCH resource is associated (associated) with a physical sidelink control channel PSCCH resource and/or a physical sidelink shared channel PSSCH resource, where Conflict indication is a conflict indication and Reservation is reservation information.

In some embodiments, as shown in the left half of FIG. 3, conflict information carried on the PSxCH indicates that a PSCCH and/or PSSCH resource associated with a PSxCH resource encounters a conflict; or conflict information carried on the PSxCH indicates that a PSFCH corresponding to a PSCCH and/or PSSCH resource associated with a PSxCH resource encounters a conflict.

A protocol may only support indicating one of PSSCH and PSFCH conflicts, or a protocol supports indicating PSSCH and PSFCH conflicts. For example, different information state values of the PSxCH indicate a PSCCH conflict and a PSFCH conflict respectively; or a same information state indicates a PSCCH conflict or a PSFCH conflict.

In some embodiments, as shown in the right half of FIG. 3, conflict information carried on the PSxCH indicates that a PSCCH and/or PSSCH resource reserved for a PSCCH and/or PSSCH resource associated with a PSxCH resource encounters a conflict; or conflict information carried on the PSxCH indicates that a PSFCH corresponding to a PSCCH and/or PSSCH resource reserved for a PSCCH and/or PSSCH resource associated with a PSxCH resource encounters a conflict.

A protocol may only support indicating that the PSCCH/PSSCH resource, reserved using reservation information of one or some preset categories, encounters/causes a conflict. For example, the conflict information indicates that a PSCCH and/or PSSCH resource reserved using a preset category of reservation information encounters a conflict, for example, periodical reservation, aperiodic reservation, a first aperiodically reserved PSCCH/PSSCH, a second aperiodically reserved PSCCH/PSSCH, a first in the next period of periodically reserved PSCCH/PSSCH, and a second in the next period of periodically reserved PSCCH/PSSCH. This can indicate the occurrence of a conflict earlier so that UE can take action earlier, for example, more time can be left for the UE for resource selection.

In addition, the state information in the PSxCH additionally carries HARQ-ACK feedback information and the PSxCH is in New PSFCH format.

In some embodiments, the PSxCH resource has a time-domain association with the PSCCH and/or PSSCH resource, including any one of the following:

one PSCCH or PSSCH occasion being associated with one PSxCH occasion, such that the design of the PSFCH can be reused to the maximum extent;

a plurality of PSCCH and/or PSSCH occasions being associated with one PSxCH occasion, such that the design of the PSFCH can be reused to the maximum extent;

one PSCCH or PSSCH occasion being associated with a plurality of PSxCH occasions; and a plurality of PSCCH and/or PSSCH occasions being associated with a plurality of PSxCH occasions.

The plurality of PSCCH and/or PSSCH occasions may be a plurality of PSCCH and/or PSSCH occasions of consecutive occurrence.

In some embodiments, in the case that one PSCCH or PSSCH occasion is associated with a plurality of PSxCH occasions; or that a plurality of PSCCH and/or PSSCH occasions are associated with a plurality of PSxCH occasions, for the plurality of PSxCH occasions, one PSxCH resource subset in the PSxCH occasions corresponds to the one PSCCH or PSSCH occasion or corresponds to the plurality of PSCCH and/or PSSCH occasions.

In some embodiments, in the case that one PSCCH or PSSCH occasion is associated with a plurality of PSxCH occasions; or that a plurality of PSCCH and/or PSSCH occasions are associated with a plurality of PSxCH occasions, content indicated by indication information carried by each PSxCH occasion in the plurality of associated PSxCH occasions is independently specified.

In some embodiments, an associated PSxCH occasion before a PSCCH and/or PSSCH at least indicates whether the PSCCH and/or PSSCH encounters a conflict, and an associated PSxCH occasion after a PSCCH and/or PSSCH at least indicates whether a PSCCH and/or PSSCH reserved for the PSCCH and/or PSSCH encounters a conflict.

In some embodiments, according to content carried by PSxCH information, in a case that multiple types of conflict information is present, each type of conflict information of a PSCCH or PSSCH is individually mapped to one PSxCH occasion.

Compared with the "one or more PSCCH or PSSCH occasions are associated with one PSxCH occasion" scenario, the "one or more PSCCH or PSSCH occasions are associated with a plurality of PSxCH occasions" scenario has more flexibility as to a position for transmitting conflict indication information and can indicate a conflict in a timely manner. For example, the resource or transmission conflicts detected at positions #1, #2, and #3 in FIG. 4 can be indicated at any time.

In some embodiments, a time interval, minimum time interval, or maximum time interval between a PSCCH and/or PSSCH occasion and an associated PSxCH occasion is K, K being a duration predefined by a protocol, configured by a control node, or pre-configured.

In some embodiments, a PSCCH and/or PSSCH occasion precedes an associated PSxCH occasion; or a PSCCH and/or PSSCH occasion follows an associated PSxCH occasion.

The above content may be predefined by a protocol, configured by a control node, or pre-configured. Optionally, if each PSCCH/PSSCH is associated with a plurality of PSxCH occasions, all of the associated PSxCH occasions precede the PSCCH/PSSCH, follow the PSCCH/PSSCH, partially precede the PSCCH/PSSCH, or partially follow the PSCCH/PSSCH.

In some embodiments, a resource on a PSCCH and/or PSSCH occasion corresponding to a PSxCH occasion is numbered; and a PSxCH resource on a PSxCH occasion is numbered; where each numbered PSCCH or PSSCH resource corresponds to one or more numbered PSxCH resources.

In some embodiments, a PSxCH occasion associated with a PSCCH and/or PSSCH resource is associated with a PSFCH occasion associated with the PSCCH and/or PSSCH resource.

In some embodiments, the PSxCH occasion associated with the PSCCH and/or PSSCH resource is within a same slot slot or a same symbol symbol in a same slot as the PSFCH occasion associated with the PSCCH and/or PSSCH resource.

In some embodiments, the PSxCH occasion associated with the PSCCH and/or PSSCH resource precedes the PSFCH occasion associated with the PSCCH and/or PSSCH resource; or the PSxCH occasion associated with the PSCCH and/or PSSCH resource follows the PSFCH occasion associated with the PSCCH and/or PSSCH resource.

The above content may be predefined by a protocol, configured by a control node, or pre-configured. For example, the PSxCH occasion associated with the PSCCH and/or PSSCH resource is the P-th PSFCH occasion that follows the PSFCH occasion associated with the PSCCH and/or PSSCH resource.

In some embodiments, the PSxCH occasion associated with the PSCCH and/or PSSCH resource and the PSFCH occasion associated with the PSCCH and/or PSSCH resource are TDMed.

In some embodiments, state information of the PSxCH carries HARQ-ACK feedback information.

In some embodiments, the processor 510 is further configured to determine a PSxCH transmit resource, where the determining a PSxCH transmit resource includes:

determining a target PSCCH and/or PSSCH resource;

determining a target PSxCH resource, the target PSxCH resource being associated with the target PSCCH and/or PSSCH resource; and selecting at least one PSxCH from the at least one target PSxCH resource for transmission.

In some embodiments, the target PSCCH and/or PSSCH resource is a PSCCH and/or PSSCH resource that encounters a conflict; or the target PSCCH and/or PSSCH resource is a PSCCH and/or PSSCH resource that causes a PSFCH conflict; and the target PSCCH and/or PSSCH resource is a third-party PSCCH and/or PSSCH resource, and the PSCCH and/or PSSCH resource that encounters a conflict is reserved for the third-party PSCCH and/or PSSCH resource; or the target PSCCH and/or PSSCH resource is a third-party PSCCH and/or PSSCH resource, and the PSCCH and/or PSSCH resource that causes a PSFCH conflict is reserved for the third-party PSCCH and/or PSSCH resource.

In some embodiments, in a case that the target PSCCH and/or PSSCH resource includes a plurality of resources, the target PSxCH resource is:

all PSxCH resources corresponding to the plurality of resources; or a PSxCH resource corresponding to one of the plurality of resources, the one resource being a resource with a largest time domain number, a smallest time domain number, a largest frequency domain number, or a smallest frequency domain number in the plurality of resources.

In some embodiments, in a case that the target PSCCH and/or PSSCH resource corresponds to a plurality of PSxCH occasions, the target PSxCH resource in at least one PSxCH occasion is selected.

In some embodiments, one PSxCH occasion is selected based on content indicated in the PSxCH occasion, for example, a resource in the selected PSxCH occasion may indicate the conflict; or at least one PSxCH occasion is selected based on an occurrence time of the PSxCH occasion, for example, one or more PSxCH occasions closest to the current detecting time are selected, or a PSxCH occasion closest to the target PSCCH/PSSCH resource is selected, which may be limited to be located before or after the target PSCCH/PSSCH resource.

In some embodiments, the selecting at least one PSxCH from at least one target PSxCH resource for transmission includes any one of the following:

selecting a PSxCH transmission resource based on a terminal identifier, for example, in a case that the number of target PSxCH resources is Q (sequentially numbered), UE uses the q-th PSxCH resource for transmission, q being UE ID mod Q, where the UE ID may be a UE ID of a target counterpart of 'trigger or notification' signaling and/or a local UE ID for transmitting the PSxCH; and selecting a PSxCH transmission resource based on a zone identifier, where the zone ID may be a zone ID of a target counterpart of 'trigger or notification' and/or a local zone ID for transmitting the PSxCH.

In some embodiments, in a case that a PSxCH transmit/receive conflict occurs, the processor 510 performs any one of the following:

abandoning reception of the PSxCH or transmission of the PSxCH according to a rule predefined by a protocol;

abandoning reception of the PSxCH or transmission of the PSxCH according to a pre-configured rule;

abandoning reception of the PSxCH or transmission of the PSxCH according to a rule configured by a control node; and abandoning reception of the PSxCH or transmission of the PSxCH based on a priority of a PSCCH and/or PSSCH resource associated with the PSxCH, for example, the one with a lower priority may be abandoned.

In some embodiments, if a plurality of transmitted PSxCHs are under conflict, the processor 510 performs any one of the following:

in case of power limitation, transmission of one or more PSxCHs is abandoned based on priorities of PSCCH and/or PSSCH resources associated with the PSxCHs, for example, the one with a lower priority may be abandoned; and in case of no power limitation, the plurality of PSxCHs are transmitted with equal power, or transmit power of the plurality of PSxCHs is determined based on priorities of PSCCH and/or PSSCH resources associated with the PSxCHs, for example, the transmit power of the one with a lower priority is lower than the transmit power of the one with a higher priority.

In some embodiments, in a case that transmission of the PSxCH conflicts with reception of a PSFCH, the processor 510 performs any one of the following:

abandoning transmission of the PSxCH or reception of the PSFCH according to a rule predefined in a protocol;

abandoning transmission of the PSxCH or reception of the PSFCH according to a pre-configured rule;

abandoning transmission of the PSxCH or reception of the PSFCH according to a rule configured by a control node; and transmitting the PSxCH or receiving the PSFCH based on a priority of a PSCCH and/or PSSCH resource associated with the PSxCH, for example, the one with a lower priority may be abandoned.

The above rule may be that the priority of the PSCCH and/or PSSCH resource associated with the PSxCH is above a threshold for PSxCH transmission, otherwise PSxCH transmission is abandoned.

In some embodiments, in a case that reception of the PSxCH conflicts with transmission of a PSFCH, the processor 510 performs any one of the following:

abandoning reception of the PSxCH or transmission of the PSFCH according to a rule predefined by a protocol;

abandoning reception of the PSxCH or transmission of the PSFCH according to a pre-configured rule;

abandoning reception of the PSxCH or transmission of the PSFCH according to a rule configured by a control node; and receiving the PSxCH or transmitting the PSFCH based on a priority of a PSCCH and/or PSSCH resource associated with the PSxCH, for example, the one with a lower priority may be abandoned.

The above rule may be that the priority of the PSCCH and/or PSSCH resource associated with the PSxCH is above a threshold for PSxCH reception, otherwise PSxCH reception is abandoned.

In some embodiments, in a case that transmission of the PSxCH conflicts with transmission of a PSFCH, in case of power limitation, the processor 510 performs at least one of the following:

discarding the PSxCH or PSFCH according to a rule predefined by a protocol, configured by a control node, or pre-configured;

transmitting the PSxCH or PSFCH based on a priority of a PSCCH and/or PSSCH resource associated with the PSxCH, for example, the one with a higher priority is transmitted in priority; and in case of no power limitation, transmitting a plurality of PSxCHs and PSFCHs with equal power, or determining transmit power of the PSxCHs based on priorities of PSCCH and/or PSSCH resources associated with the PSxCHs, for example, the transmit power of the one with a lower priority is lower than the transmit power of the one with a higher priority.

The above rule may be that the priority of the PSCCH and/or PSSCH resource associated with the PSxCH is above a threshold for PSxCH transmission, otherwise PSxCH transmission is abandoned.

In some embodiments, the performing conflict indication through a physical sidelink feedback channel PSFCH resource corresponding to a resource under conflict:

reporting negative acknowledgement NACK on the PSFCH corresponding to the resource under conflict.

In some embodiments, the processor 510 is configured to obtain, by performing any one of the following, conflict indication information indicated by a first terminal:

receiving conflict indication signaling from the first terminal;

monitoring a physical sidelink channel PSxCH corresponding to a physical sidelink control channel PSCCH transmission resource and/or a physical sidelink shared channel PSSCH transmission resource to obtain conflict indication information; and monitoring a physical sidelink feedback channel PSFCH resource to obtain information of a resource under conflict.

UE performs PSCCH/PSSCH transmission, and the processor 510 monitors at least a PSxCH resource corresponding to its PSCCH/PSSCH transmission resource to monitor conflict indication information, where the transmission resource includes a receive resource and a transmit resource.

An embodiment of this application further provides a readable storage medium, where the readable storage medium may be non-volatile or volatile. The readable storage medium stores a program or instructions, and when the program or instructions are executed by a processor, the processes of the foregoing embodiments of the conflict indication method are implemented, with the same technical effects achieved. To avoid repetition, details are not described herein again.

The processor is the processor in the electronic device in the foregoing embodiments. The readable storage medium includes a computer-readable storage medium, such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the foregoing embodiments of the conflict indication method, with the same technical effects achieved. To avoid repetition, details are not described herein again.

It should be understood that the chip mentioned in the embodiments of this application may also be referred to as a system-level chip, a system chip, a chip system, a system on chip, or the like.

An embodiment of this application further provides a computer program product, where the computer program product is stored in a non-transitory readable storage medium. When the computer program product is executed by at least one processor, the processes of the foregoing embodiments of the conflict indication method are implemented, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially, or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

Embodiments of this application have been described with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A conflict indication method performed by a first terminal, wherein the method comprises:

in a case that a resource or transmission conflict is determined, indicating the resource or transmission conflict to a second terminal, comprising:

performing conflict indication through a physical sidelink channel (PSxCH);

wherein a PSxCH resource is associated with a physical sidelink control channel (PSCCH) resource and/or a physical sidelink shared channel (PSSCH) resource; and conflict information carried on the PSxCH indicates that a PSCCH and/or PSSCH resource associated with a PSxCH resource encounters a conflict; a PSCCH and/or PSSCH occasion follows an associated PSxCH occasion, a minimum time interval between each PSCCH/PSSCH occasion and the associated PSxCH occasion is Kmin, the PSxCH occasion associated with the PSCCH/PSSCH occasion is a first PSxCH, after the PSCCH/PSSCH, that satisfies the interval;

or conflict information carried on the PSxCH indicates that a PSCCH and/or PSSCH resource reserved for a PSCCH and/or PSSCH resource associated with a PSxCH resource encounters a conflict; a PSCCH and/or PSSCH occasion precedes an associated PSxCH occasion; a minimum time interval between each PSCCH/PSSCH occasion and the associated PSxCH occasion is Kmin, the PSxCH associated with the PSCCH/PSSCH occasion is a first PSxCH, before the PSCCH/PSSCH, that satisfies the interval.

2. The conflict indication method according to claim 1, wherein a first time at which the conflict indication signaling is transmitted satisfies any one of the following:

being after a second time and having an interval to the second time less than a first threshold or not greater than the first threshold, wherein the second time is a time at which the resource or transmission conflict is detected;

being before the resource under conflict and having an interval to a time at which the resource under conflict is present greater than a second threshold or not less than the second threshold; and being before a third time and having an interval to the third time greater than a third threshold or not less than the third threshold, wherein the third time is a time at which reserved indication signaling or indication signaling for the resource under conflict is transmitted.

3. The conflict indication method according to claim 1, wherein a PSxCH resource comprises at least one of a time domain resource, a frequency domain resource, and a code domain resource; wherein the time domain resource comprises L time domain basic units predefined by a protocol, configured by a control node, or pre-configured, L being a positive integer;

the frequency domain resource comprises F frequency domain basic units predefined by a protocol, configured by a control node, or pre-configured, F being a positive integer; and the code domain resource comprises C code sequences predefined by a protocol, configured by a control node, or pre-configured, or is a code sequence generated according to a sequence generation rule predefined by a protocol, configured by a control node, or pre-configured, C being a positive integer.

4. The conflict indication method according to claim 1, wherein state information of the PSxCH is expressed using any one of the following:

at least one of a time domain basic unit, a frequency domain basic unit, and a code sequence; and a coded bit.

5. The conflict indication method according to claim 1, wherein the PSxCH channel comprises X PSxCH occasions in time domain, the PSxCH occasion comprises Y PSxCH frequency domain resources, and the PSxCH channel comprises Z code domain resources, X, Y, and Z being positive integers.

6. The conflict indication method according to claim 1, wherein in the case that the conflict information carried on the PSxCH indicates that a PSCCH and/or PSSCH resource associated with a PSxCH resource encounters a conflict;

different information state values of the PSxCH indicate a PSCCH conflict and a PSFCH conflict respectively; or a same information state indicates a PSCCH conflict or a PSFCH conflict.

7. The conflict indication method according to claim 1, wherein in the case that the conflict information carried on the PSxCH indicates that a PSCCH and/or PSSCH resource reserved for a PSCCH and/or PSSCH resource associated with a PSxCH resource encounters a conflict;

the conflict information indicates that the PSCCH and/or PSSCH resource reserved using reservation information of a preset category encounters a conflict;

the PSCCH and/or PSSCH resource reserved using the reservation information of the preset category comprises:

a first aperiodically reserved PSCCH/PSSCH; or a first in the next period of periodically reserved PSCCH/PSSCH.

8. The conflict indication method according to claim 1, wherein the PSxCH resource has a time-domain association with the PSCCH and/or PSSCH resource, comprising any one of the following:

one PSCCH or PSSCH occasion being associated with one PSxCH occasion;

a plurality of PSCCH and/or PSSCH occasions being associated with one PSxCH occasion;

one PSCCH or PSSCH occasion being associated with a plurality of PSxCH occasions; and a plurality of PSCCH and/or PSSCH occasions being associated with a plurality of PSxCH occasions.

9. The conflict indication method according to claim 1, wherein a time interval, or maximum time interval between the PSCCH and/or PSSCH occasion and the associated PSxCH occasion is K, K being a duration predefined by a protocol, configured by a control node, or pre-configured.

10. The conflict indication method according to claim 1, wherein a resource on a PSCCH and/or PSSCH occasion corresponding to a PSxCH occasion is numbered; and a PSxCH resource on a PSxCH occasion is numbered; where each numbered PSCCH or PSSCH resource corresponds to one or more numbered PSxCH resources.

11. An electronic device comprising a processor, a memory, and a program or instructions stored in the memory and capable of running on the processor, wherein when the program or instructions are executed by the processor, following steps are implemented:

in a case that a resource or transmission conflict is determined, indicating the resource or transmission conflict to a second terminal, comprising:

performing conflict indication through a physical sidelink channel (PSxCH);

wherein a PSxCH resource is associated with a physical sidelink control channel (PSCCH) resource and/or a physical sidelink shared channel (PSSCH) resource; and conflict information carried on the PSxCH indicates that a PSCCH and/or PSSCH resource associated with a PSxCH resource encounters a conflict; a PSCCH and/or PSSCH occasion follows an associated PSxCH occasion, a minimum time interval between each PSCCH/PSSCH occasion and the associated PSxCH occasion is Kmin, the PSxCH occasion associated with the PSCCH/PSSCH occasion is a first PSxCH, after the PSCCH/PSSCH, that satisfies the interval;

or conflict information carried on the PSxCH indicates that a PSCCH and/or PSSCH resource reserved for a PSCCH and/or PSSCH resource associated with a PSxCH resource encounters a conflict; a PSCCH and/or PSSCH occasion precedes an associated PSxCH occasion; a minimum time interval between each PSCCH/PSSCH occasion and the associated PSxCH occasion is Kmin, the PSxCH associated with the PSCCH/PSSCH occasion is a first PSxCH, before the PSCCH/PSSCH, that satisfies the interval.

12. The electronic device according to claim 11, wherein a time interval, or maximum time interval between the PSCCH and/or PSSCH occasion and the associated PSxCH occasion is K, K being a duration predefined by a protocol, configured by a control node, or pre-configured.

13. A non-transitory readable storage medium, wherein the non-transitory readable storage medium stores a program or instructions, and when the program or instructions are executed by a processor, following steps are implemented:

in a case that a resource or transmission conflict is determined, indicating the resource or transmission conflict to a second terminal, comprising performing conflict indication through a physical sidelink channel (PSxCH);

wherein a PSxCH resource is associated with a physical sidelink control channel (PSCCH) resource and/or a physical sidelink shared channel (PSSCH) resource; and conflict information carried on the PSxCH indicates that a PSCCH and/or PSSCH resource associated with a PSxCH resource encounters a conflict; a PSCCH and/or PSSCH occasion follows an associated PSxCH occasion, a minimum time interval between each PSCCH/PSSCH occasion and the associated PSxCH occasion is Kmin, the PSxCH occasion associated with the PSCCH/PSSCH occasion is a first PSxCH, after the PSCCH/PSSCH, that satisfies the interval;

or conflict information carried on the PSxCH indicates that a PSCCH and/or PSSCH resource reserved for a PSCCH and/or PSSCH resource associated with a PSxCH resource encounters a conflict; a PSCCH and/or PSSCH occasion precedes an associated PSxCH occasion; a minimum time interval between each PSCCH/PSSCH occasion and the associated PSxCH occasion is Kmin, the PSxCH associated with the PSCCH/PSSCH occasion is a first PSxCH, before the PSCCH/PSSCH, that satisfies the interval.

14. The non-transitory readable storage medium according to claim 13, wherein a time interval, or maximum time interval between the PSCCH and/or PSSCH occasion and the associated PSxCH occasion is K, K being a duration predefined by a protocol, configured by a control node, or pre-configured.

* * * * *